(12) United States Patent
Liao et al.

(10) Patent No.: US 10,698,180 B2
(45) Date of Patent: Jun. 30, 2020

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Cheng-Yuan Liao, Taichung (TW); Shu-Yun Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 94 days.

(21) Appl. No.: 15/867,534

(22) Filed: Jan. 10, 2018

(65) Prior Publication Data
US 2019/0094498 A1    Mar. 28, 2019

(30) Foreign Application Priority Data
Sep. 27, 2017    (TW) .............................. 106133142 A

(51) Int. Cl.
| | | |
|---|---|---|
| *G02B 3/02* | (2006.01) | |
| *G02B 13/18* | (2006.01) | |
| *G02B 13/00* | (2006.01) | |
| *G02B 13/02* | (2006.01) | |
| *G02B 9/62* | (2006.01) | |

(52) U.S. Cl.
CPC ........... *G02B 13/0045* (2013.01); *G02B 9/62* (2013.01); *G02B 13/02* (2013.01)

(58) Field of Classification Search
CPC ...... G02B 1/041; G02B 9/62; G02B 13/0045; G02B 13/18; G02B 13/006; G02B 27/0025

USPC .................................................. 359/713, 752
See application file for complete search history.

(56) References Cited

U.S. PATENT DOCUMENTS

| | | |
|---|---|---|
| 5,448,319 A | 9/1995 | Uzawa |
| 8,711,492 B2 | 4/2014 | Huang |
| 9,459,432 B2 | 10/2016 | Komiyama |
| 9,678,327 B2 | 6/2017 | Harada |
| 2014/0015999 A1 | 1/2014 | Miyano |
| 2014/0198395 A1 | 7/2014 | Ryu et al. |
| 2015/0277088 A1 | 10/2015 | Chang |
| 2016/0077313 A1 | 3/2016 | Komiyama |
| 2016/0187617 A1 | 6/2016 | Komiyama |
| 2017/0153418 A1 | 6/2017 | Cai |
| 2018/0095237 A1 | 4/2018 | Kanzaki |
| 2018/0188494 A1 | 7/2018 | Chang et al. |
| 2018/0188495 A1 | 7/2018 | Chang et al. |

FOREIGN PATENT DOCUMENTS

| | | |
|---|---|---|
| CN | 204188869 U | 3/2015 |
| CN | 205067849 U | 3/2016 |
| CN | 205157867 U | 4/2016 |
| CN | 106772958 A | 5/2017 |
| JP | H04-267212 A | 9/1992 |

(Continued)

*Primary Examiner* — Mahidere S Sahle
(74) *Attorney, Agent, or Firm* — Maschoff Brennan

(57) ABSTRACT

An optical imaging lens assembly includes six lens elements which are, in order from an object side to an image side: a first lens element, a second lens element, a third lens element, a fourth lens element, a fifth lens element and a sixth lens element. The second lens element with negative refractive power has an image-side surface being concave in a paraxial region thereof. The fifth lens element has negative refractive power. The sixth lens element has positive refractive power.

16 Claims, 27 Drawing Sheets

(56) References Cited

FOREIGN PATENT DOCUMENTS

| | | |
|---|---|---|
| JP | 2001-281544 A | 10/2001 |
| JP | 2004-029282 A | 1/2004 |
| JP | 2008-076716 A | 4/2008 |
| JP | 2009-092798 A | 4/2009 |
| JP | 2014-085559 A | 5/2014 |
| JP | 2015-190999 A | 11/2015 |
| JP | 2016-014754 A | 1/2016 |

OPTICAL IMAGING LENS ASSEMBLY, IMAGE CAPTURING UNIT AND ELECTRONIC DEVICE

RELATED APPLICATIONS

This application claims priority to Taiwan Application 106133142, filed on Sep. 27, 2017, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various requirements, the specifications of a camera module are strictly demanded so that the camera module can be applied to different kinds of electronic devices, such as advanced driver assistance systems (ADAS), dashboard cameras, lane departure warning systems (LDWS), vehicle backup cameras, blind spot detection systems, multiple lens devices, intelligent electronic devices, wearable devices, digital cameras, drones, sport cameras, network surveillance devices, human-computer interaction systems and other electronic imaging devices.

In conventional camera modules, due to the limitation to the shape of lens surfaces and the material selection, it is difficult to reduce the size thereof as well as satisfy the requirements of a smooth lens shape, easier lens assembling and low sensitivity. Furthermore, the capability of functioning normally under different environmental conditions while providing high quality images is an important factor for design of the camera modules. Take the aforementioned automotive devices for example, the camera modules can be disposed on the front side, the lateral side or other positions of a car in order to detect the objects in the surrounding environment. The angle of view of the camera modules can be determined according to its proposed sensing distance, direction and range. Moreover, the images captured by camera modules are processed by software to determine the condition of the environment, thereby achieving self-driving or driver assistance. The camera modules can work with telecommunication devices, radars, automatic high beam systems, blind spot detectors, pedestrian detectors, intelligent brake systems, road sign recognition systems or global positioning system (GPS) so as to improve traffic safety and bring convenience to daily life. To keep the automotive devices properly functioning in various kinds of conditions, such as driving in high temperature variation environments or encountering impacts while driving on unpaved roads, the camera modules should be designed to have high heat resistance, high corrosion resistance and high mechanical strength.

Therefore, there is a need to develop an optical system featuring wide field of view, compact size, high image quality and high resistance to environmental change.

SUMMARY

According to one aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The second lens element with negative refractive power has an image-side surface being concave in a paraxial region thereof. The fifth lens element has negative refractive power. The sixth lens element has positive refractive power. When a curvature radius of an object-side surface of the fifth lens element is R9, a curvature radius of an image-side surface of the fifth lens element is R10, a focal length of the optical imaging lens assembly is f, a focal length of the fifth lens element is f5, a focal length of the sixth lens element is f6, an entrance pupil diameter of the optical imaging lens assembly is EPD, a central thickness of the third lens element is CT3, a central thickness of the sixth lens element is CT6, the following conditions are satisfied:

$0.0 < (R9+R10)/(R9-R10);$ $f/EPD < 3.50;$ $|f5/CT3| < 1.85;$ and $|f6/CT6| < 0.70.$ According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet another aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The first lens element has an image-side surface being concave in a paraxial region thereof. The second lens element has negative refractive power. The fifth lens element has negative refractive power. The sixth lens element has positive refractive power. When a curvature radius of an object-side surface of the fifth lens element is R9, a curvature radius of an image-side surface of the fifth lens element is R10, a focal length of the optical imaging lens assembly is f, a focal length of the fifth lens element is f5, an entrance pupil diameter of the optical imaging lens assembly is EPD, a central thickness of the third lens element is CT3, an Abbe number of the fourth lens element is V4, an Abbe number of the fifth lens element is V5, the following conditions are satisfied:

$0.60 < (R9+R10)/(R9-R10);$ $f/EPD < 3.50;$ $|f5/CT3| < 1.85;$ and $V4-V5 < 27.0.$ According to yet still another aspect of the present disclosure, an optical imaging lens assembly includes six lens elements. The six lens elements are, in order from an object side to an image side, a first lens element, a second lens element, a third lens element, a fourth lens element, a fifth lens element and a sixth lens element. The second lens element with negative refractive power has an image-side surface being concave in a paraxial region thereof. The fifth lens element has negative refractive power. The sixth lens element has positive refractive power. When a curvature radius of an object-side surface of the fifth lens element is R9, a curvature radius of an image-side surface of the fifth lens element is R10, a focal length of the optical imaging lens assembly is f, a focal length of the sixth lens element is f6, an entrance pupil diameter of the optical imaging lens assembly is EPD, a central thickness of the third lens element is CT3, a central thickness of the sixth lens element is CT6, an axial distance between an image-side surface of the sixth lens element and an image surface is BL, the following conditions are satisfied:

$0.0 < (R9+R10)/(R9-R10)$;

$f/EPD < 2.80$;

$|f6/CT6| < 0.90$; and $BL/CT3 < 1.0$.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
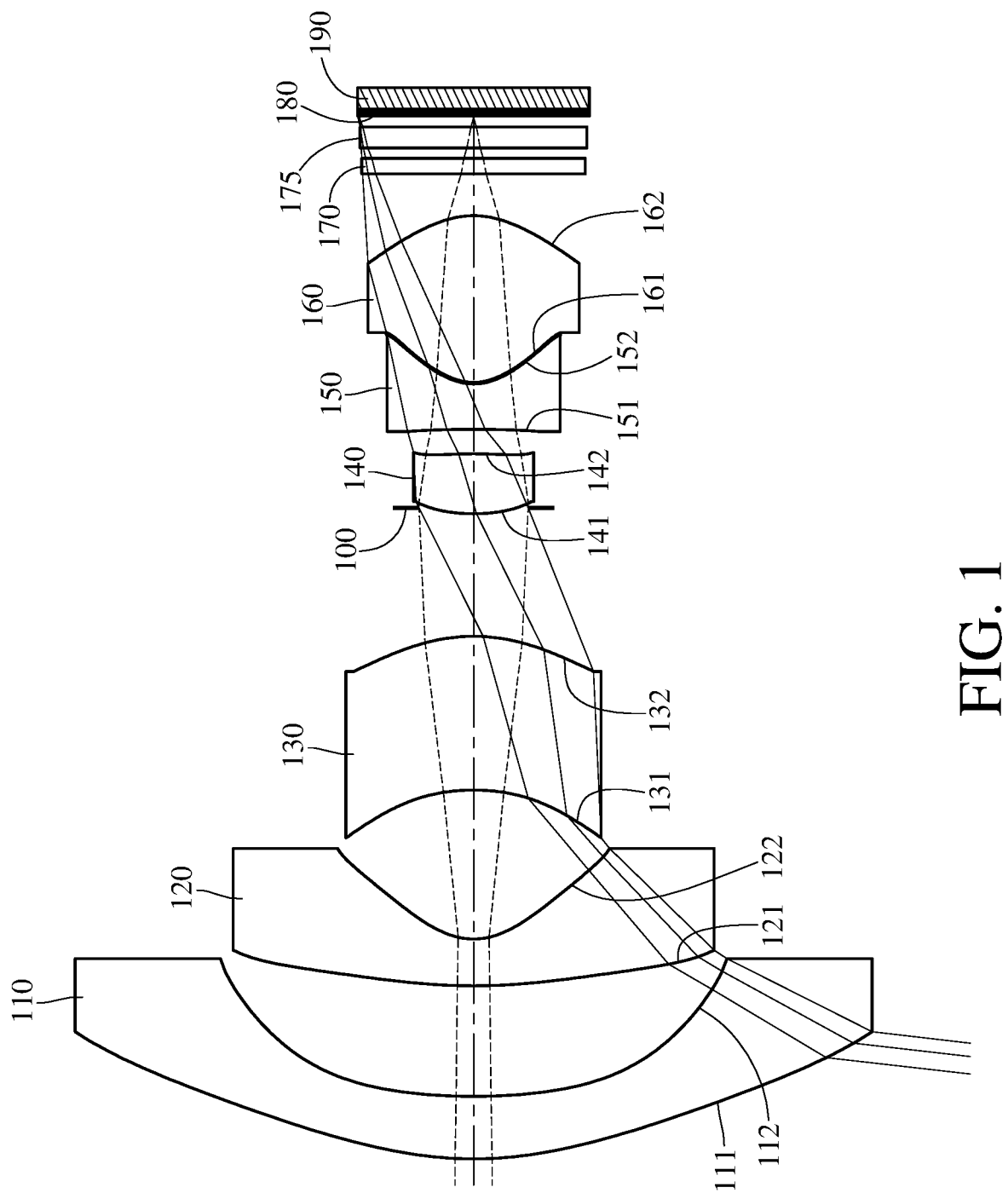
FIG. 1 is a schematic view of an image capturing unit according to the 1st embodiment of the present disclosure.

An optical imaging lens assembly includes six lens elements. The six lens elements are, in order from an object side to an image side, a first lens element, a second lens element, a third lens element, a fourth lens element, a fifth lens element and a sixth lens element.

The first lens element can have an image-side surface being concave in a paraxial region thereof. Therefore, it is favorable for providing the optical imaging lens assembly with a retro-focus configuration for gathering light from large angle of view.

The second lens element has negative refractive power; therefore, it is favorable for balancing the refractive power distribution between the first lens element and the second lens element so as to gather light from large angle of view, and thereby broaden the field of view, such that the optical imaging lens assembly is applicable to more kinds of applications. The second lens element can have an object-side surface being convex in a paraxial region thereof; therefore, it is favorable for providing the optical imaging lens assembly with a wide-angle lens configuration so as to broaden the field of view. The second lens element can have an image-side surface being concave in a paraxial region thereof; therefore, it is favorable for correcting aberrations generated due to an overly large incident angle.

The third lens element can have positive refractive power; therefore, it is favorable for balancing the negative refractive power on the object side of the optical imaging lens assembly, so that light rays with large angle of view are properly refracted and propagated in the optical imaging lens assembly. The third lens element can have an image-side surface being convex in a paraxial region thereof; therefore, it is favorable for moderating the incident light rays with large angle of view and correcting aberrations on the object side of the optical imaging lens assembly.

The fourth lens element can have positive refractive power; therefore, it is favorable for balancing the negative refractive power on the object side of the optical imaging lens assembly, moderating the incident light with large angle of view, reducing sensitivity, and enhancing light convergence capability so as to reduce a total track length of the optical imaging lens assembly, thereby meeting the requirement of compactness. The fourth lens element can have an object-side surface being convex in a paraxial region thereof; therefore, it is favorable for correcting spherical aberration so as to improve the image quality. The fourth lens element can have an image-side surface being convex in a paraxial region thereof; therefore, it is favorable for keeping sufficient refractive power of the fourth lens element so as to reduce sensitivity.

The fifth lens element has negative refractive power; therefore, it is favorable for correcting chromatic aberration on the image side of the optical imaging lens assembly so as to improve the image quality. The fifth lens element can have an image-side surface being concave in a paraxial region thereof; therefore, it is favorable for correcting chromatic aberration to improve the image quality.

The sixth lens element has positive refractive power; therefore, it is favorable for the sixth lens element to work with the fifth lens element to correct off-axis aberrations and alleviate the influence of environmental temperature change on a back focal length of the optical imaging lens assembly, thereby reducing sensitivity and improving the image quality. The sixth lens element can have an object-side surface being convex in a paraxial region thereof and an image-side surface being convex in a paraxial region thereof; therefore, it is favorable for reducing the angle of light rays incident in the image surface in the off-axis region so as to provide high illuminance and correct off-axis aberrations.

At least one of the image-side surface of the fifth lens element and the object-side surface of the sixth lens element can have at least one inflection point. Therefore, it is favorable for peripheral light rays being received by the image surface, thereby preventing stray light, which is generated due to an overly large incident angle, from degrading the image quality; furthermore, it is favorable for reducing the angle of light rays incident in the image surface in the off-axis region so as to provide high illuminance and further improve the image quality.

When a curvature radius of an object-side surface of the fifth lens element is R9, and a curvature radius of the image-side surface of the fifth lens element is R10, the following condition is satisfied: $0.0<(R9+R10)/(R9-R10)$. Therefore, adjusting a shape of the fifth lens element is favorable for correcting off-axis aberrations on the image side of the optical imaging lens assembly so as to increase image brightness and improve the image quality. Preferably, the following condition can be satisfied: $0.60<(R9+R10)/(R9-R10)$. More preferably, the following condition can also be satisfied: $0.65<(R9+R10)/(R9-R10)<2.50$.

When a focal length of the optical imaging lens assembly is f, and an entrance pupil diameter of the optical imaging lens assembly is EPD, the following condition is satisfied: $f/EPD<3.50$. Therefore, it is favorable for gathering sufficient amount of incident light to increase illuminance on the image surface, so that an imaging capturing unit including the optical imaging lens assembly is able to capture enough image information in low light condition (for example, in the night) or short exposure photography (for example, dynamic photography), and thus an electronic device equipped with the imaging capturing unit is able to work under various conditions. Preferably, the following condition can be satisfied: $f/EPD<2.80$. More preferably, the following condition can also be satisfied: $0.50<f/EPD<2.50$.

When a focal length of the fifth lens element is f5, and a central thickness of the third lens element is CT3, the following condition can be satisfied: $|f5/CT3|<1.85$. Therefore, it is favorable for moderating light rays with large angle of view so that the light rays are properly propagated in the optical imaging lens assembly; furthermore, it is favorable for the fifth lens element equipped with sufficient refractive power so as to correct chromatic aberration and improve the image quality. Preferably, the following condition can also be satisfied: $0.10<|f5/CT3|<1.50$.

When a focal length of the sixth lens element is f6, and a central thickness of the sixth lens element is CT6, the following condition can be satisfied: $|f6/CT6|<0.90$. Therefore, it is favorable for the sixth lens element to have sufficient positive refractive power to correct off-axis aberrations on the image side of the optical imaging lens assembly, and reducing the total track length of the optical imaging lens assembly so as to achieve compactness for various applications. Preferably, the following condition can be satisfied: $|f6/CT6|<0.80$. More preferably, the following condition can be satisfied: $|f6/CT6|<0.70$. Much more preferably, the following condition can also be satisfied: $0.10<|f6/CT6|<0.65$.

When an Abbe number of the fourth lens element is V4, and an Abbe number of the fifth lens element is V5, the following condition can be satisfied: $V4-V5<29.0$. Therefore, selecting proper materials of the fourth lens element and the fifth lens element is favorable for reducing the sensitivity to the temperature variation among different environments, and correcting chromatic aberration so as to improve the image quality. Preferably, the following condition can be satisfied: $V4-V5<27.0$. More preferably, the following condition can also be satisfied: $1.0<V4-V5<25.0$.

When an axial distance between the image-side surface of the sixth lens element and an image surface is BL, and the central thickness of the third lens element is CT3, the following condition can be satisfied: $BL/CT3<1.0$. Therefore, keeping a proper ratio of the back focal length to the central thickness of the third lens element is favorable for reducing the back focal length and propagating light with large angle of view in the optical imaging lens assembly, thereby obtaining a balance among low sensitivity, compactness and high illuminance.

When the central thickness of the third lens element is CT3, and a central thickness of the fourth lens element is CT4, the following condition can be satisfied: $CT4/CT3<1.0$. Therefore, maintaining a proper ratio of the central thickness of the fourth lens element to the central thickness of the third lens element is favorable for gathering light from large angle of view and increasing the stability of the optical imaging lens assembly. Preferably, the following condition can also be satisfied: $0.10<CT4/CT3<0.70$.

When half of a maximum field of view of the optical imaging lens assembly is HFOV, the following condition can be satisfied: $1/|\tan(HFOV)|<0.35$. Therefore, it is favorable for increasing the field of view for more applications.

When a central thickness of the first lens element is CT1, and the central thickness of the third lens element is CT3, the following condition can be satisfied: $0.10<CT1/CT3<0.65$. Therefore, keeping a proper ratio of the central thickness of the first lens element to the central thickness of the third lens element is favorable for properly refracting light rays with large angle of view so as to reduce sensitivity. Preferably, the following condition can also be satisfied: $0.20<CT1/CT3<0.65$.

When a refractive power of the first lens element is P1, a refractive power of the second lens element is P2, a refractive power of the third lens element is P3, a refractive power of the fourth lens element is P4, a refractive power of the fifth lens element is P5, and a refractive power of the sixth lens element is P6, the following condition can be satisfied: $(|P1|+|P2|+|P3|+|P4|)/(|P5|+|P6|)<0.70$. Therefore, properly arranging the refractive power of the six lens elements to obtain the wide-angle lens configuration is favorable for increasing the imaging range for various applications. According to the present disclosure, a refractive power of a single lens element is a ratio of the focal length of the optical imaging lens assembly to the focal length of the single lens element.

When the focal length of the fifth lens element is f5, the central thickness of the third lens element is CT3, and the central thickness of the sixth lens element is CT6, the following condition can be satisfied: $|f5/CT6|+|f5/CT3|<2.0$. Therefore, it is favorable for obtaining good space utilization so as to obtain a balance among compactness, low sensitivity and high manufacturing yield rate. Preferably, the following condition can also be satisfied: $0.10<|f5/CT6|+|f5/CT3|<1.45$.

When a focal length of the first lens element is f1, a focal length of the second lens element is f2, and a focal length of the third lens element is f3, the following conditions can be satisfied: $|f2|<|f1|$; and $|f2|<|f3|$. Therefore, properly arranging the refractive power of the lens elements on the object side of the optical imaging lens assembly is favorable for obtaining the wide-angle lens configuration so as to broaden the field of view, such that the optical imaging lens assembly is applicable to more kinds of applications.

When an Abbe number of the third lens element is V3, the Abbe number of the fourth lens element is V4, and the Abbe number of the fifth lens element is V5, the following condition can be satisfied: $30<V3+V4+V5<105$. Therefore, the materials of the third, the fourth and the fifth lens elements are properly selected so as to prevent f-theta (f−θ) distortion due to the optical imaging lens assembly having wide field of view, thereby preventing image distortion and increasing image resolution.

When a central thickness of the fifth lens element is CT5, and the central thickness of the sixth lens element is CT6, the following condition can be satisfied: $0.50<CT6/CT5<5.0$. Therefore, controlling a ratio of the central thickness of the sixth lens element to the central thickness of the fifth lens element is favorable for balancing the space arrangement of the optical imaging lens assembly, thereby ensuring high image quality. Preferably, the following condition can also be satisfied: $1.0<CT6/CT5<3.75$.

When a curvature radius of the object-side surface of the sixth lens element is R11, and a curvature radius of the image-side surface of the sixth lens element is R12, the following condition can be satisfied: $|R11/R12|<0.50$. Therefore, in cooperation with the fifth lens element, a shape of the sixth lens element is favorable for correcting off-axis aberrations, and preventing stray light generated on the image side of the optical imaging lens assembly so as to increase illuminance on the image surface and improve the image quality. Preferably, the following condition can also be satisfied: $|R11/R12|<0.45$.

According to the present disclosure, the optical imaging lens assembly further includes an aperture stop. When an axial distance between the aperture stop and the object-side surface of the fourth lens element is Dsr7, and an axial distance between the aperture stop and the image-side surface of the fourth lens element is Dsr8, the following condition can be satisfied: $|Dsr7/Dsr8|<1.0$. Therefore, controlling the position of the aperture stop is favorable for simultaneously increasing image-sensing efficiency of the image sensor and maintaining sufficient field of view.

According to the present disclosure, both the image-side surface of the fifth lens element and the object-side surface of the sixth lens element can be aspheric, and the fifth lens element and the sixth lens element can be cemented to each other. When a refractive index of the fifth lens element is N5, and a refractive index of the sixth lens element is N6, the following condition can be satisfied: $3.0<N5+N6<3.30$. Therefore, selecting proper materials of the fifth and the sixth lens elements is favorable for minimizing manufacturing cost and reducing the total track length; furthermore, the fifth lens element and the sixth lens element being cemented to each other on their aspheric surfaces is favorable for reducing the impact of temperature variation on the optical imaging lens assembly and correcting off-axis aberrations.

Figure 23:
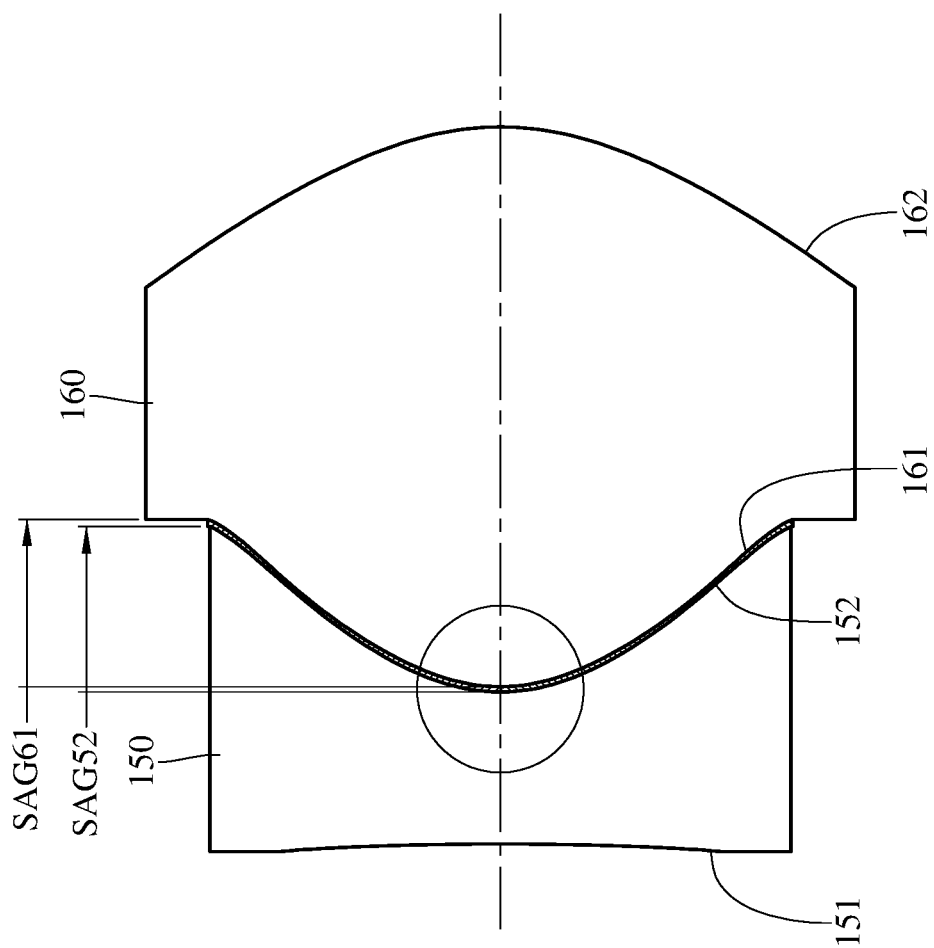
FIG. 23 shows a schematic view of SAG52 and SAG61 according to the 1st embodiment of the present disclosure.

When a displacement in parallel with an optical axis from an axial vertex of the image-side surface of the fifth lens element to a maximum effective radius position of the image-side surface of the fifth lens element is SAG52, and a displacement in parallel with the optical axis from an axial vertex of the object-side surface of the sixth lens element to a maximum effective radius position of the object-side surface of the sixth lens element is SAG61, the following condition can be satisfied: $SAG52<SAG61$. Therefore, adjusting the shapes of the image-side surface of the fifth lens element and the object-side surface of the sixth lens element is favorable for enhancing the shape design flexibility of the lens surfaces and correcting off-axis aberrations. Please refer to FIG. 23, which shows a schematic view of SAG52 and SAG61 according to the 1st embodiment of the present disclosure. When the direction from the axial vertex of one surface to the maximum effective radius position of the same surface is facing towards the image side of the optical imaging lens assembly, the value of SAG52 or SAG61 is positive; when the direction from the axial vertex of the surface to the maximum effective radius position of the same surface is facing towards the object side of the optical imaging lens assembly, the value of SAG52 or SAG61 is negative.

When a curvature radius of an object-side surface of the third lens element is R5, and a curvature radius of the image-side surface of the third lens element is R6, the following condition can be satisfied: $|R6/R5|<1.50$. Therefore, adjusting a shape of the third lens element is favorable for correcting aberrations generated by large incident angle and reducing sensitivity.

According to the present disclosure, at least three of the six lens elements of the optical imaging lens assembly can be made of plastic material, and all object-side surfaces and image-side surfaces of the at least three lens elements can be aspheric. Therefore, the materials of the lens elements are properly selected so as to reduce manufacturing cost; furthermore, the aspheric surfaces are favorable for meeting the requirement of compactness and improving the image quality.

Figure 24:
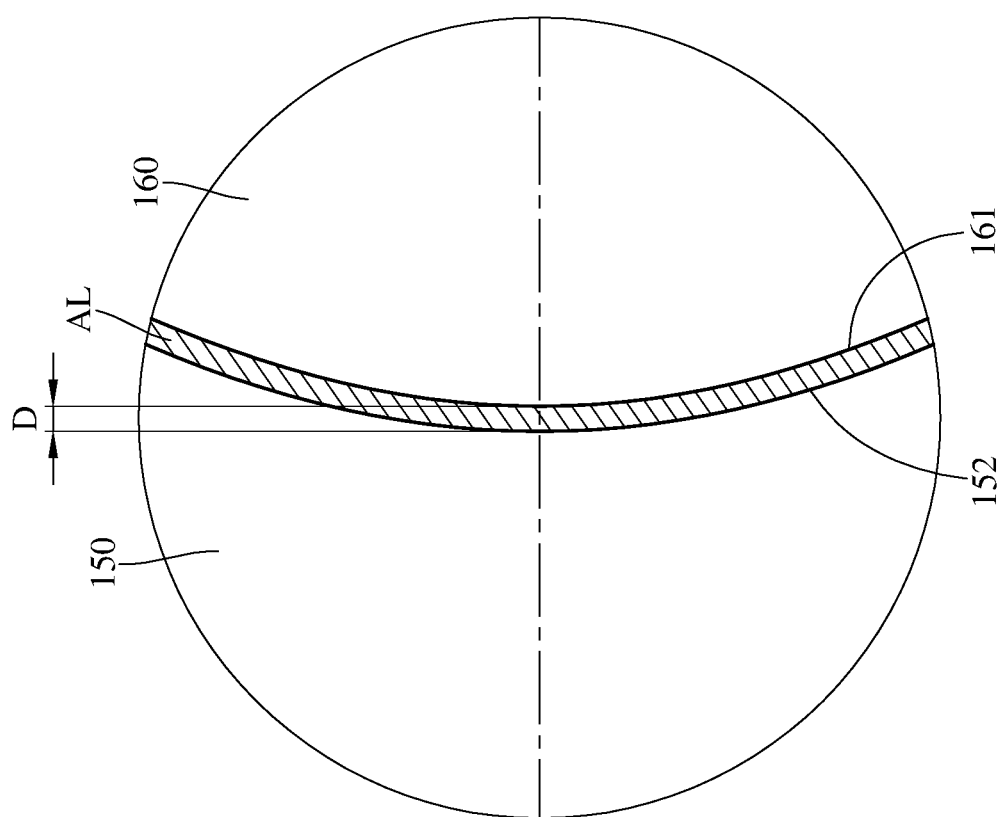
FIG. 24 shows a schematic view of a central thickness of an adhesive layer between a fifth lens element and a sixth lens element according to the 1st embodiment of the present disclosure.

According to the present disclosure, when the fifth lens element and the sixth lens element are cemented to each other, a central thickness of an adhesive layer between the image-side surface of the fifth lens element and the object-side surface of the sixth lens element is D, and the following condition can be satisfied: 0.02 [mm]≤D<0.05 [mm]. Therefore, a proper thickness of the adhesive layer is favorable for maintaining a good manufacturing yield rate; furthermore, the fifth lens element and the sixth lens element being cemented to each other on their aspheric surfaces is favorable for reducing the impact of temperature variation on the optical imaging lens assembly and correcting off-axis aberrations. Please refer to FIG. 24, which shows an adhesive layer AL between an image-side surface 152 of a fifth lens element 150 and an object-side surface 161 of a sixth lens element 160, and the central thickness D of the adhesive layer AL, according to the 1st embodiment of the present disclosure.

According to the present disclosure, an absolute value of the curvature radius of the image-side surface of the fifth lens element and an absolute value of the curvature radius of the object-side surface of the sixth lens element are both smaller than the absolute values of the curvature radii of the other lens surfaces of the six lens elements. That is, both the image-side surface of the fifth lens element and the object-side surface of the sixth lens element have smaller absolute value of curvature radius than the object-side surfaces and the image-side surfaces of the first through the fourth lens elements, the object-side surface of the fifth lens element, and the image-side surface of the sixth lens element. Therefore, a proper arrangement of the curvature radii of the lens surfaces of the six lens elements is favorable for correcting off-axis aberrations, increasing illuminance on the image surface and improving the image quality.

When the displacement in parallel with the optical axis from the axial vertex of the image-side surface of the fifth lens element to the maximum effective radius position of the image-side surface of the fifth lens element is SAG52, and the displacement in parallel with the optical axis from the axial vertex of the object-side surface of the sixth lens element to the maximum effective radius position of the object-side surface of the sixth lens element is SAG61, the following condition can be satisfied: 0.03 [mm]<|SAG52−SAG61|×100. Therefore, adjusting the shapes of the image-side surface of the fifth lens element and the object-side surface of the sixth lens element is favorable for enhancing the shape design flexibility of the lens surfaces and correcting off-axis aberrations. Preferably, the following condition can also be satisfied: 0.05 [mm]<|SAG52−SAG61|×100<6.0 [mm].

When a refractive index of the first lens element is N1, and a refractive index of the fourth lens element is N4, the following condition can be satisfied: 1.70 (N1+N4)/2<2.80. Therefore, selecting proper materials of the first lens element and the fourth lens element is favorable for the optical imaging lens assembly to be applicable to different environmental conditions, so the optical imaging lens assembly is capable of functioning normally under different environmental conditions, such as environments having different temperature and humidity, while providing high quality images.

According to the present disclosure, the aforementioned features and conditions can be utilized in numerous combinations so as to achieve corresponding effects.

According to the present disclosure, the lens elements thereof can be made of glass or plastic material. When the lens elements are made of glass material, the distribution of the refractive power of the optical imaging lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical imaging lens assembly can also be reduced.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the demand of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, an image capturing unit includes the aforementioned optical imaging lens assembly and an image sensor, wherein the image sensor is disposed on the image surface of the optical imaging lens assembly. In some embodiments, the image capturing unit can further include a barrel, a holder member or a combination thereof.

Figure 25:
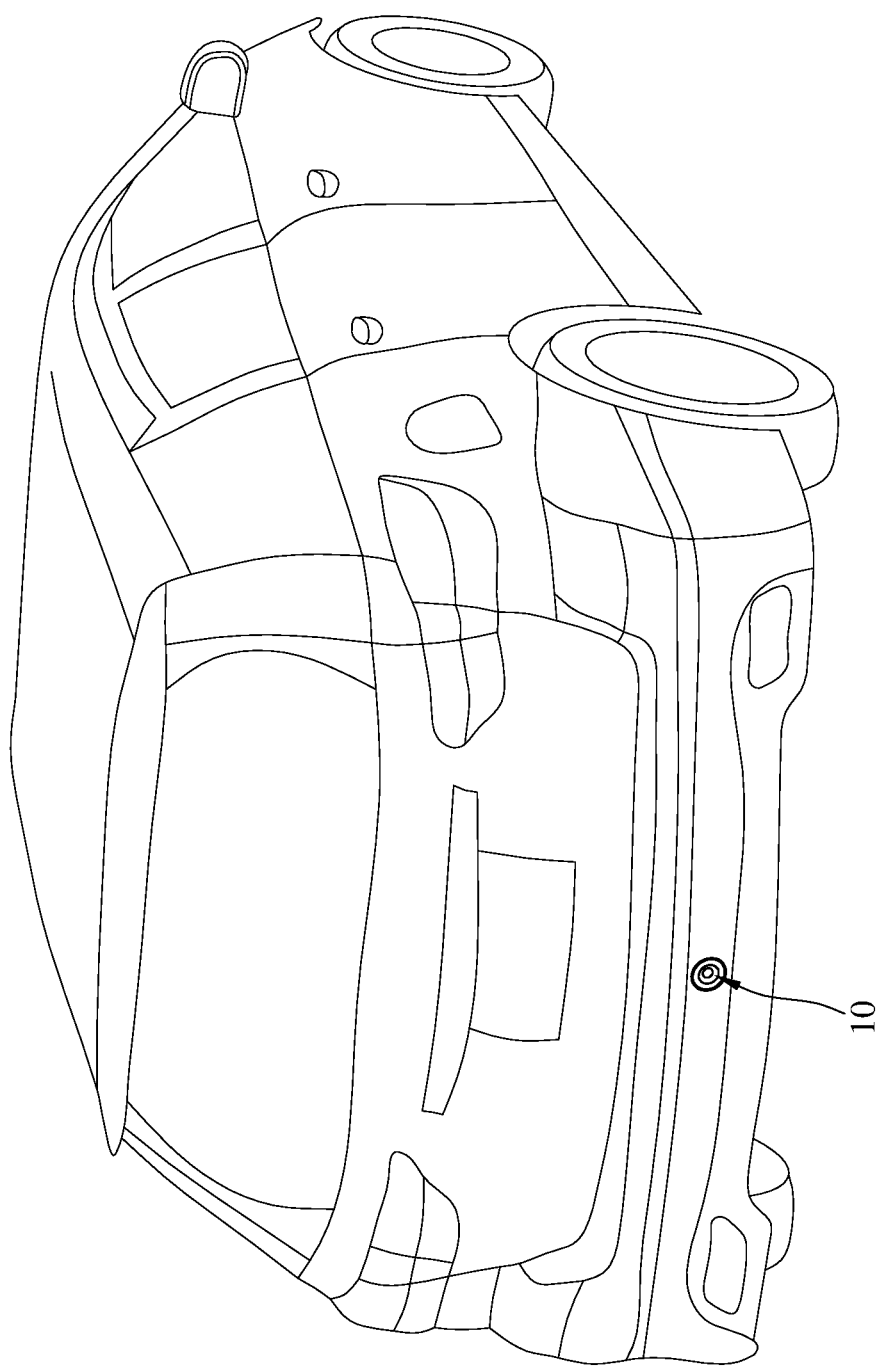
FIG. 25 shows an electronic device according to one embodiment.
Figure 26:
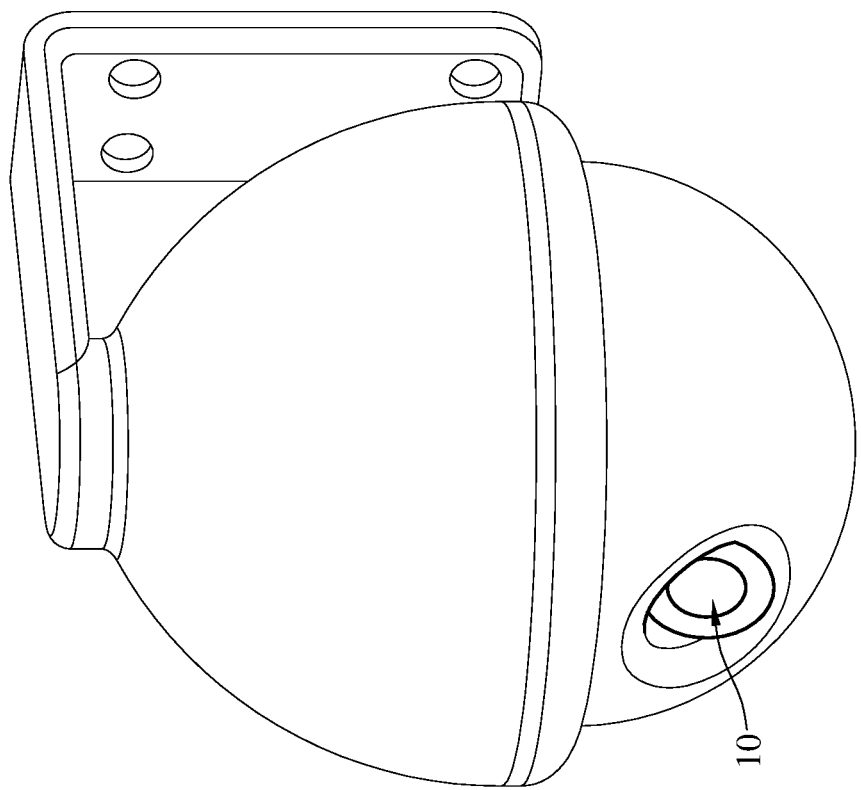
FIG. 26 shows an electronic device according to another embodiment.
Figure 27:
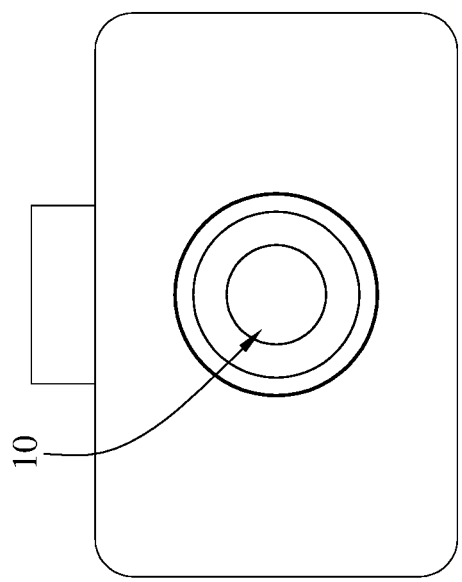
FIG. 27 shows an electronic device according to still another embodiment.

According to the present disclosure, the aforementioned image capturing unit may be installed in, but not limited to, an electronic device. Please refer to FIG. 25, FIG. 26 and FIG. 27, an image capturing unit 10 can be applied to electronic devices, such as a vehicle backup camera (FIG. 25), a network surveillance device (FIG. 26) or a dashboard camera (FIG. 27). In some embodiments, the electronic device can further include, but not limited to, a control unit, a display unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly features good capability in aberration corrections and high image quality, and can be applied to 3D (three-dimensional) image capturing applications, in products, such as advanced driver assistance systems (ADAS), lane departure warning systems (LDWS), blind spot detection systems, multiple lens devices, smart phones, smart televisions, digital cameras, drones, sport cameras, mobile devices, digital tablets, network surveillance devices, motion sensing input devices, wearable devices and other electronic imaging devices. The aforementioned electronic devices are only exemplary for showing the image capturing unit of the present disclosure installed in an electronic device and are not limited thereto.

According to the above description of the present disclosure, the following specific embodiments are provided for further explanation.

1st Embodiment

Figure 2:
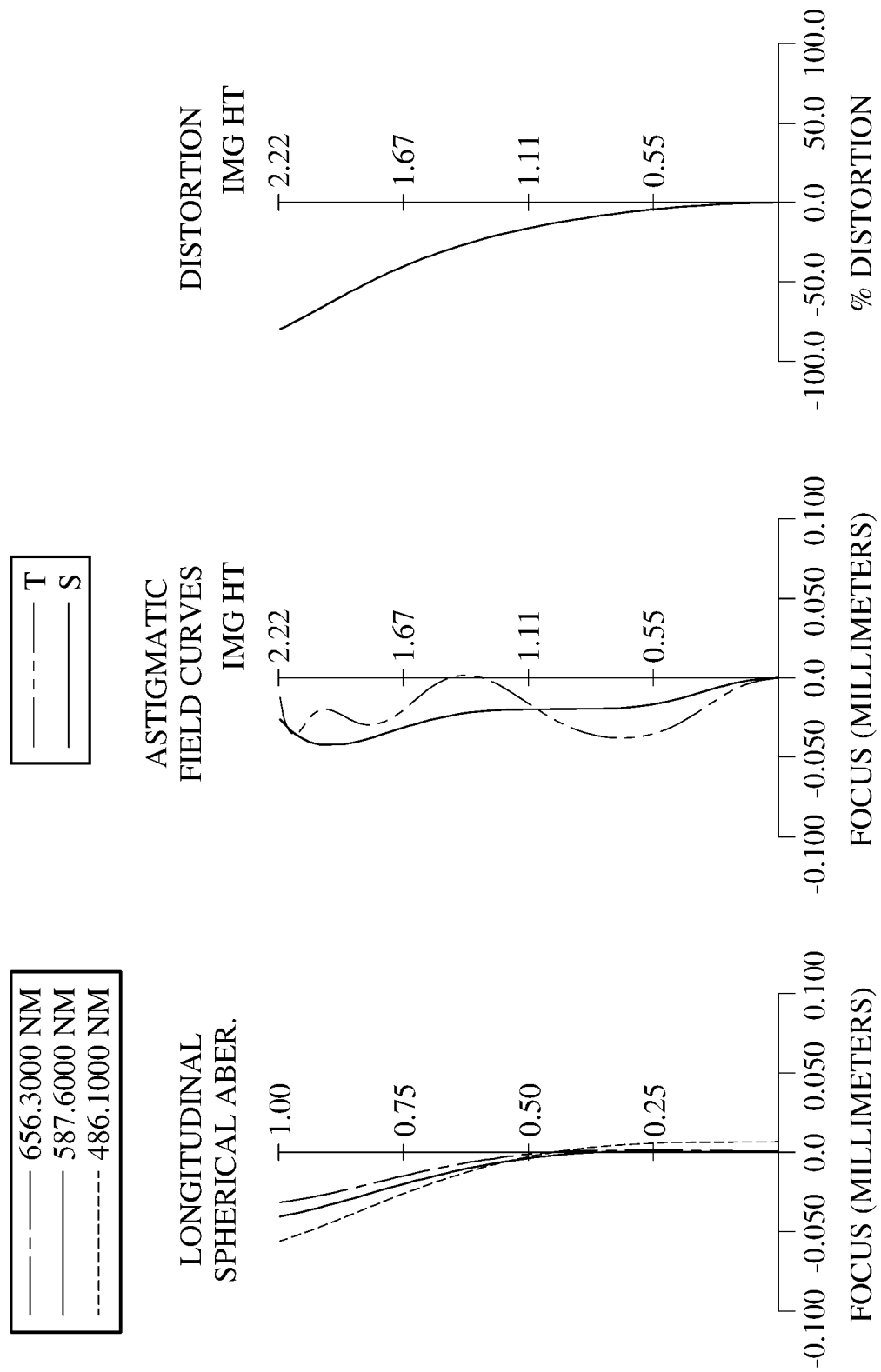
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 190. The optical imaging lens assembly includes, in order from an object side to an image side, a first lens element 110, a second lens element 120, a third lens element 130, an aperture stop 100, a fourth lens element 140, a fifth lens element 150, a sixth lens element 160, a filter 170, a cover glass 175 and an image surface 180. The optical imaging lens assembly includes six lens elements (110, 120, 130, 140, 150 and 160) with no additional lens element disposed between each of the adjacent six lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one inflection point.

The sixth lens element 160 with positive refractive power has an object-side surface 161 being convex in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 152 of the fifth lens element 150 and the object-side surface 161 of the sixth lens element 160 are cemented to each other.

The filter 170 and the cover glass 175 are both made of glass material and located between the sixth lens element 160 and the image surface 180, and will not affect the focal length of the optical imaging lens assembly. The image sensor 190 is disposed on or near the image surface 180 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=1.29 millimeters (mm), Fno=1.82, HFOV=83.4 degrees (deg.).

When half of the maximum field of view of the optical imaging lens assembly is HFOV, the following condition is satisfied: $1/|\tan(\text{HFOV})|=0.11$.

When an Abbe number of the fourth lens element 140 is V4, and an Abbe number of the fifth lens element 150 is V5, the following condition is satisfied: $V4-V5=6.7$.

When an Abbe number of the third lens element 130 is V3, the Abbe number of the fourth lens element 140 is V4, and the Abbe number of the fifth lens element 150 is V5, the following condition is satisfied: $V3+V4+V5=109.6$.

When a refractive index of the first lens element 110 is N1, and a refractive index of the fourth lens element 140 is N4, the following condition is satisfied: $(N1+N4)/2=1.564$.

When a refractive index of the fifth lens element 150 is N5, and a refractive index of the sixth lens element 160 is N6, the following condition is satisfied: $N5+N6=3.182$.

When a curvature radius of the object-side surface 151 of the fifth lens element 150 is R9, and a curvature radius of the image-side surface 152 of the fifth lens element 150 is R10, the following condition is satisfied: $(R9+R10)/(R9-R10)=0.90$.

When a curvature radius of the object-side surface 131 of the third lens element 130 is R5, and a curvature radius of the image-side surface 132 of the third lens element 130 is R6, the following condition is satisfied: $|R6/R5|=0.87$.

When a curvature radius of the object-side surface 161 of the sixth lens element 160 is R11, and a curvature radius of the image-side surface 162 of the sixth lens element 160 is R12, the following condition is satisfied: $|R11/R12|=0.60$.

When a central thickness of the first lens element 110 is CT1, and a central thickness of the third lens element 130 is CT3, the following condition is satisfied: $CT1/CT3=0.41$.

When the central thickness of the third lens element 130 is CT3, and a central thickness of the fourth lens element 140 is CT4, the following condition is satisfied: $CT4/CT3=0.39$.

When a central thickness of the fifth lens element 150 is CT5, and a central thickness of the sixth lens element 160 is CT6, the following condition is satisfied: $CT6/CT5=3.68$.

When the focal length of the optical imaging lens assembly is f, and an entrance pupil diameter of the optical imaging lens assembly is EPD, the following condition is satisfied: $f/EPD=1.82$.

When a focal length of the fifth lens element 150 is f5, and the central thickness of the third lens element 130 is CT3, the following condition is satisfied: $|f5/CT3|=0.51$.

When a focal length of the sixth lens element 160 is f6, and the central thickness of the sixth lens element 160 is CT6, the following condition is satisfied: $|f6/CT6|=0.62$.

When the focal length of the fifth lens element 150 is f5, the central thickness of the third lens element 130 is CT3, and the central thickness of the sixth lens element 160 is CT6, the following condition is satisfied: $|f5/CT6|+|f5/CT3|=0.98$.

When an axial distance between the image-side surface 162 of the sixth lens element 160 and the image surface 180 is BL, and the central thickness of the third lens element 130 is CT3, the following condition is satisfied: $BL/CT3=0.65$.

When a refractive power of the first lens element 110 is P1, a refractive power of the second lens element 120 is P2, a refractive power of the third lens element 130 is P3, a refractive power of the fourth lens element 140 is P4, a refractive power of the fifth lens element 150 is P5, and a refractive power of the sixth lens element 160 is P6, the following condition is satisfied: $(|P1|+|P2|+|P3|+|P4|)/(|P5|+|P6|)=0.60$.

When a displacement in parallel with an optical axis from an axial vertex of the image-side surface 152 of the fifth lens element 150 to a maximum effective radius position of the image-side surface 152 of the fifth lens element 150 is SAG52, the following condition is satisfied: $SAG52=0.946$ [mm].

When a displacement in parallel with the optical axis from an axial vertex of the object-side surface 161 of the sixth lens element 160 to a maximum effective radius position of the object-side surface 161 of the sixth lens element 160 is SAG61, the following condition is satisfied: $SAG61=0.957$ [mm].

When the displacement in parallel with the optical axis from the axial vertex of the image-side surface 152 of the fifth lens element 150 to the maximum effective radius position of the image-side surface 152 of the fifth lens element 150 is SAG52, and the displacement in parallel with the optical axis from the axial vertex of the object-side surface 161 of the sixth lens element 160 to the maximum effective radius position of the object-side surface 161 of the sixth lens element 160 is SAG61, the following condition is satisfied: $|SAG52-SAG61|\times100=1.10$ [mm].

When a central thickness of an adhesive layer between the image-side surface 152 of the fifth lens element 150 and the object-side surface 161 of the sixth lens element 160 is D, the following condition is satisfied: $D=0.03$ [mm].

When an axial distance between the aperture stop 100 and the object-side surface 141 of the fourth lens element 140 is Dsr7, and an axial distance between the aperture stop 100 and the image-side surface 142 of the fourth lens element 140 is Dsr8, the following condition is satisfied: $|Dsr7/Dsr8|=0.11$.

The detailed optical data of the 1st embodiment are shown in Table 1 and the aspheric surface data are shown in Table 2 below.

TABLE 1

1st Embodiment
f = 1.29 mm, Fno = 1.82, HFOV = 83.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.281 | (ASP) | 1.200 | Plastic | 1.545 | 56.0 | 32.37 |
| 2 | | 11.685 | (ASP) | 2.121 | | | | |
| 3 | Lens 2 | 10.743 | (ASP) | 0.896 | Plastic | 1.544 | 55.9 | -2.70 |
| 4 | | 1.253 | (ASP) | 2.860 | | | | |
| 5 | Lens 3 | -3.798 | (ASP) | 2.950 | Plastic | 1.544 | 55.9 | 15.09 |
| 6 | | -3.306 | (ASP) | 2.461 | | | | |
| 7 | Ape. Stop | Plano | | -0.111 | | | | |
| 8 | Lens 4 | 3.434 | (ASP) | 1.151 | Plastic | 1.582 | 30.2 | 4.24 |
| 9 | | -7.692 | (ASP) | 0.470 | | | | |
| 10 | Lens 5 | -19.985 | (ASP) | 0.869 | Plastic | 1.639 | 23.5 | -1.50 |

TABLE 1-continued

1st Embodiment
f = 1.29 mm, Fno = 1.82, HFOV = 83.4 deg.

| Surface # | | Curvature Radius | | Thickness | Material | Index | Abbe # | Focal Length |
|---|---|---|---|---|---|---|---|---|
| 11 | | 1.026 | (ASP) | 0.030 | Cemented | 1.485 | 53.2 | |
| 12 | Lens 6 | 0.971 | (ASP) | 3.200 | Plastic | 1.544 | 55.9 | 1.98 |
| 13 | | −1.627 | (ASP) | 0.800 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.211 | | | | |
| 18 | Image | Plano | | — | | | | |

Note:
Reference wavelength is 587.6 nm (d-line).

TABLE 2

Aspheric Coefficients

| Surface # | 1 | 2 | 3 | 4 | 5 | 6 |
|---|---|---|---|---|---|---|
| k= | −5.2594E+00 | 4.6992E+00 | −5.8660E+00 | −8.0155E−01 | −4.5102E−01 | −2.3069E+00 |
| A4= | −1.1110E−04 | 1.1384E−03 | −1.6509E−03 | −4.9967E−02 | −1.0246E−02 | −1.9036E−04 |
| A6= | 9.7715E−07 | 8.4697E−05 | 6.3500E−05 | 9.8753E−04 | 1.3929E−03 | −1.8386E−05 |
| A8= | 2.2777E−08 | −2.2924E−06 | −8.0493E−07 | 1.6533E−04 | 6.8661E−05 | 1.0278E−04 |
| A10= | −1.0235E−11 | −2.4012E−08 | 3.5332E−08 | −3.8604E−05 | −1.3111E−05 | −1.1419E−05 |

| Surface # | 8 | 9 | 10 | 11 | 12 | 13 |
|---|---|---|---|---|---|---|
| k= | 9.8722E−01 | −8.1848E+01 | 9.0358E+01 | −1.2254E+00 | −7.5497E−01 | −1.7580E+00 |
| A4= | 2.1449E−02 | 2.6597E−02 | 5.9661E−03 | −4.7169E−02 | −1.6692E−01 | 1.2797E−02 |
| A6= | 4.8617E−03 | 1.2746E−02 | −7.4186E−03 | 6.8188E−03 | 3.9628E−02 | −1.1915E−04 |
| A8= | 8.1443E−04 | 2.2559E−03 | 4.4964E−03 | 1.0666E−02 | 6.2216E−03 | −1.0408E−03 |
| A10= | 7.8285E−05 | 1.3034E−03 | −1.3344E−03 | −6.2560E−03 | −7.6094E−03 | 1.6162E−04 |
| A12= | — | — | — | 8.0706E−04 | 8.9183E−04 | — |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
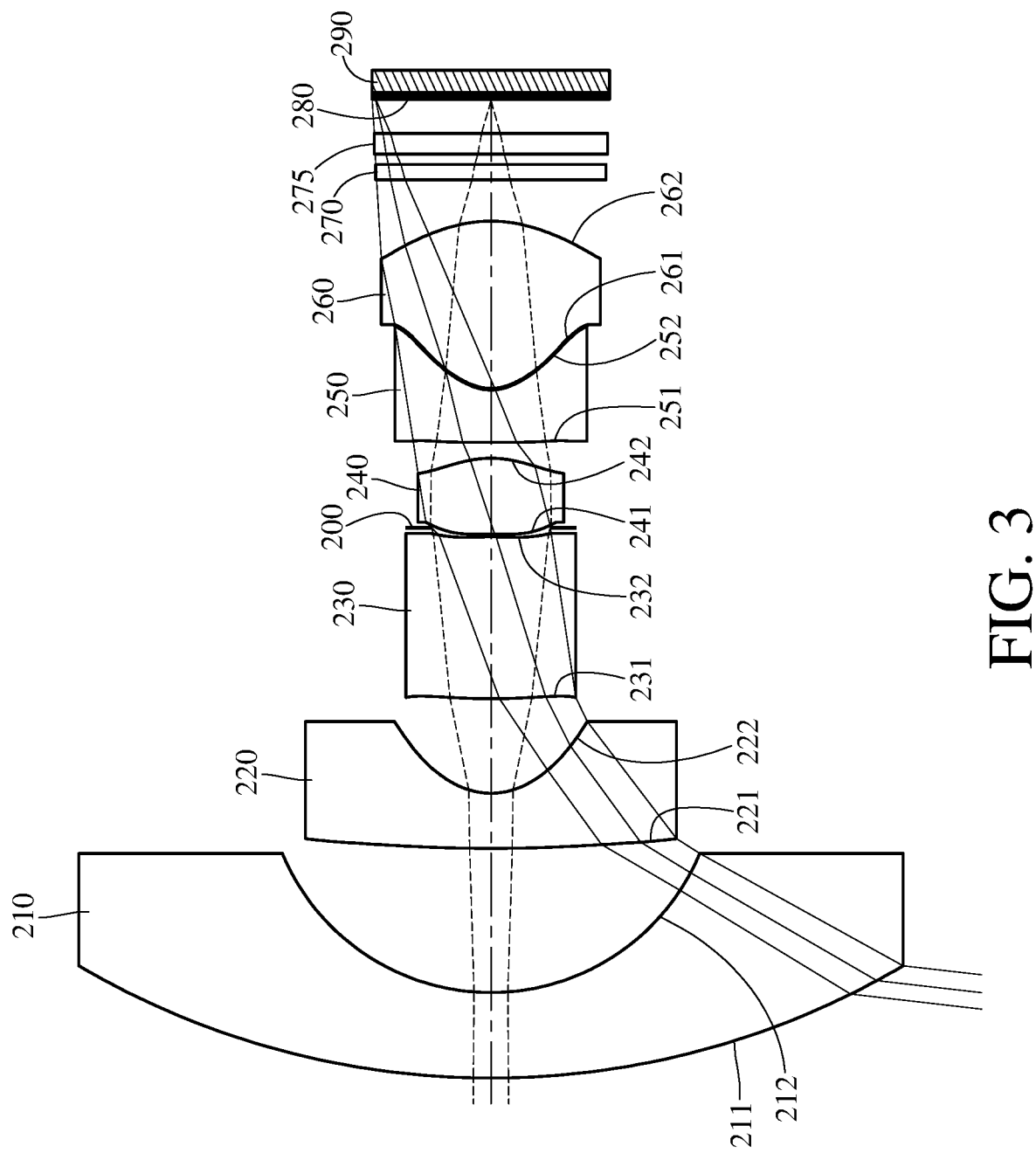
FIG. 3 is a schematic view of an image capturing unit according to the 2nd embodiment of the present disclosure.
Figure 4:
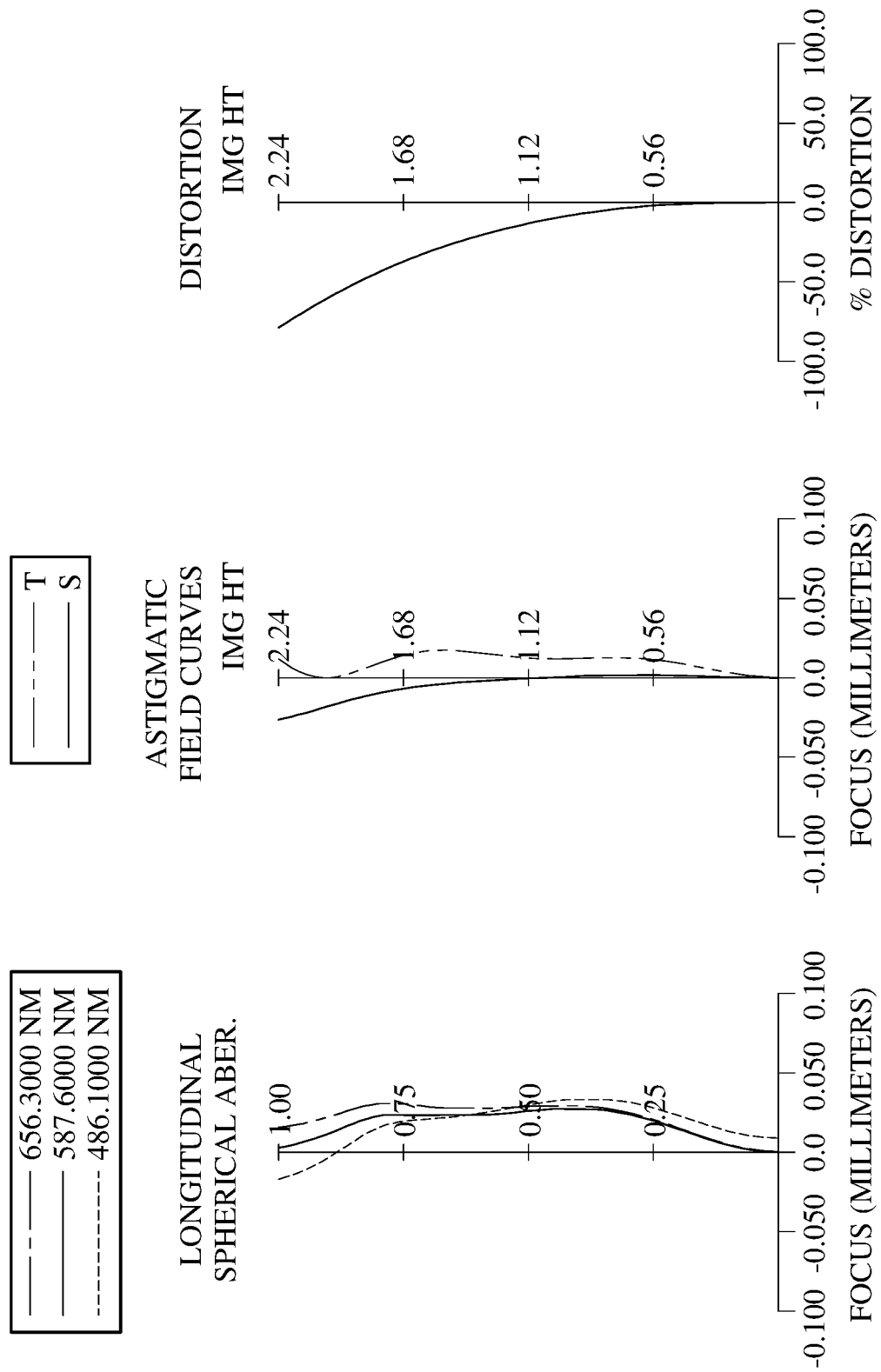
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 290. The optical imaging lens assembly includes, in order from an object side to an image side, a first lens element 210, a second lens element 220, a third lens element 230, an aperture stop 200, a fourth lens element 240, a fifth lens element 250, a sixth lens element 260, a filter 270, a cover glass 275 and an image surface 280. The optical imaging lens assembly includes six lens elements (210, 220, 230, 240, 250 and 260) with no additional lens element disposed between each of the adjacent six lens elements.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both spherical.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one inflection point.

The sixth lens element 260 with positive refractive power has an object-side surface 261 being convex in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 252 of the fifth lens element 250 and the object-side surface 261 of the sixth lens element 260 are cemented to each other.

The filter 270 and the cover glass 275 are both made of glass material and located between the sixth lens element 260 and the image surface 280, and will not affect the focal length of the optical imaging lens assembly. The image sensor 290 is disposed on or near the image surface 280 of the optical imaging lens assembly.

The detailed optical data of the 2nd embodiment are shown in Table 3 and the aspheric surface data are shown in Table 4 below.

TABLE 3

2nd Embodiment
f = 1.23 mm, Fno = 1.80, HFOV = 83.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.753 | | 1.660 | Glass | 1.569 | 56.1 | −11.27 |
| 2 | | 4.383 | | 2.799 | | | | |
| 3 | Lens 2 | 28.497 | (ASP) | 1.070 | Plastic | 1.544 | 55.9 | −2.67 |
| 4 | | 1.361 | (ASP) | 1.837 | | | | |
| 5 | Lens 3 | 11.344 | (ASP) | 3.144 | Plastic | 1.639 | 23.5 | 6.47 |
| 6 | | −5.801 | (ASP) | 0.176 | | | | |
| 7 | Ape. Stop | Plano | | −0.126 | | | | |
| 8 | Lens 4 | −14.836 | (ASP) | 1.476 | Plastic | 1.582 | 30.2 | 3.81 |
| 9 | | −2.000 | (ASP) | 0.311 | | | | |
| 10 | Lens 5 | −72.857 | (ASP) | 1.015 | Plastic | 1.639 | 23.5 | −1.36 |
| 11 | | 0.886 | (ASP) | 0.030 | Cemented | 1.485 | 53.2 | |
| 12 | Lens 6 | 0.885 | (ASP) | 3.250 | Plastic | 1.544 | 55.9 | 1.81 |
| 13 | | −2.528 | (ASP) | 0.800 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.663 | | | | |
| 18 | Image | Plano | | — | | | | |

Note:
Reference wavelength is 587.6 nm (d-line).

TABLE 4

| Aspheric Coefficients | | | | | |
|---|---|---|---|---|---|
| Surface # | 3 | 4 | 5 | 6 | 8 |
| k = | 1.4957E+01 | −2.9502E+00 | −9.0000E+01 | −9.0000E+01 | −2.9235E+01 |
| A4 = | −3.8869E−04 | 8.6586E−02 | 1.9723E−04 | 1.5796E−01 | 2.3978E−01 |
| A6 = | −3.4566E−05 | −2.4275E−02 | −2.4922E−03 | −7.5142E−02 | −1.3310E−01 |
| A8 = | 3.3615E−06 | 6.3212E−03 | 7.1846E−04 | 1.0642E−02 | 4.4597E−02 |
| A10 = | −2.5003E−08 | −7.3426E−04 | −3.9509E−04 | — | −7.0651E−03 |
| Surface # | 9 | 10 | 11 | 12 | 13 |
| k = | −3.7583E+00 | 9.0000E+01 | −1.0682E+00 | −1.3172E+00 | −8.5029E+00 |
| A4 = | 2.1456E−02 | 3.1067E−02 | −1.4917E−01 | −1.3131E−01 | −3.4036E−02 |
| A6 = | −1.2005E−02 | −1.4102E−02 | 1.0175E−01 | 1.2528E−01 | 1.3048E−02 |
| A8 = | 1.3380E−02 | 5.6563E−03 | −3.2856E−02 | −4.4072E−02 | −3.0881E−03 |
| A10 = | −3.4111E−03 | −1.8197E−03 | 3.4142E−03 | 4.8467E−03 | 2.9659E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.23 | CT6/CT5 | 3.20 |
| Fno | 1.80 | f/EPD | 1.80 |
| HFOV [deg.] | 83.5 | |f5/CT3| | 0.43 |
| 1/|tan(HFOV)| | 0.11 | |f6/CT6| | 0.56 |

-continued

| 2nd Embodiment | | | |
|---|---|---|---|
| V4 − V5 | 6.7 | \|f5/CT6\| + \|f5/CT3\| | 0.85 |
| V3 + V4 + V5 | 77.2 | BL/CT3 | 0.75 |
| (N1 + N4)/2 | 1.576 | (\|P1\| + \|P2\| + \|P3\| + \|P4\|)/(\|P5\| + \|P6\|) | 0.69 |
| N5 + N6 | 3.182 | SAG52 [mm] | 1.238 |
| (R9 + R10)/(R9 − R10) | 0.98 | SAG61 [mm] | 1.242 |
| \|R6/R5\| | 0.51 | \|SAG52 − SAG61\| × 100 [mm] | 0.40 |
| \|R11/R12\| | 0.35 | D [mm] | 0.03 |
| CT1/CT3 | 0.53 | \|Dsr7/Dsr8\| | 0.09 |
| CT4/CT3 | 0.47 | — | — |

3rd Embodiment

Figure 5:
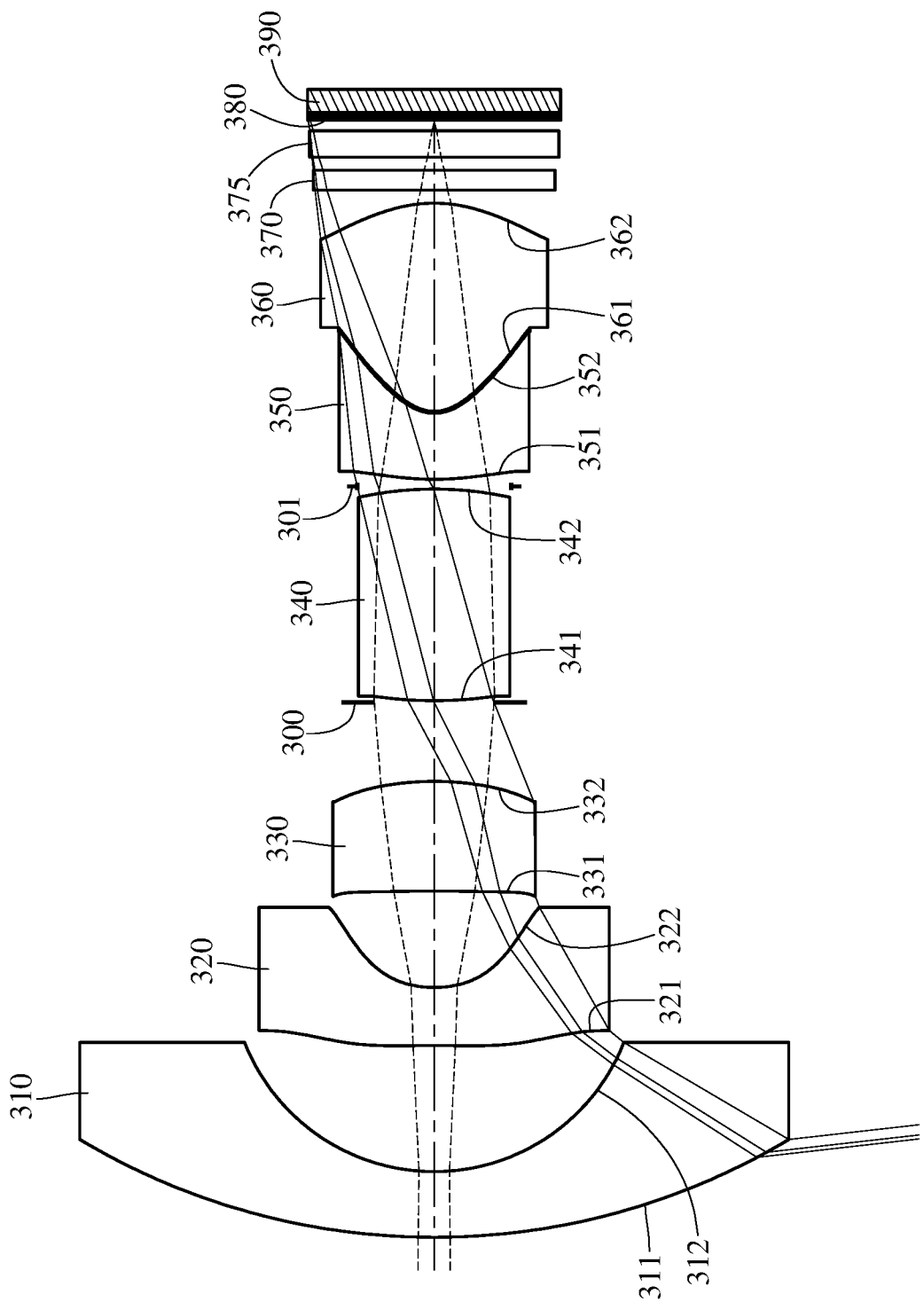
FIG. 5 is a schematic view of an image capturing unit according to the 3rd embodiment of the present disclosure.
Figure 6:
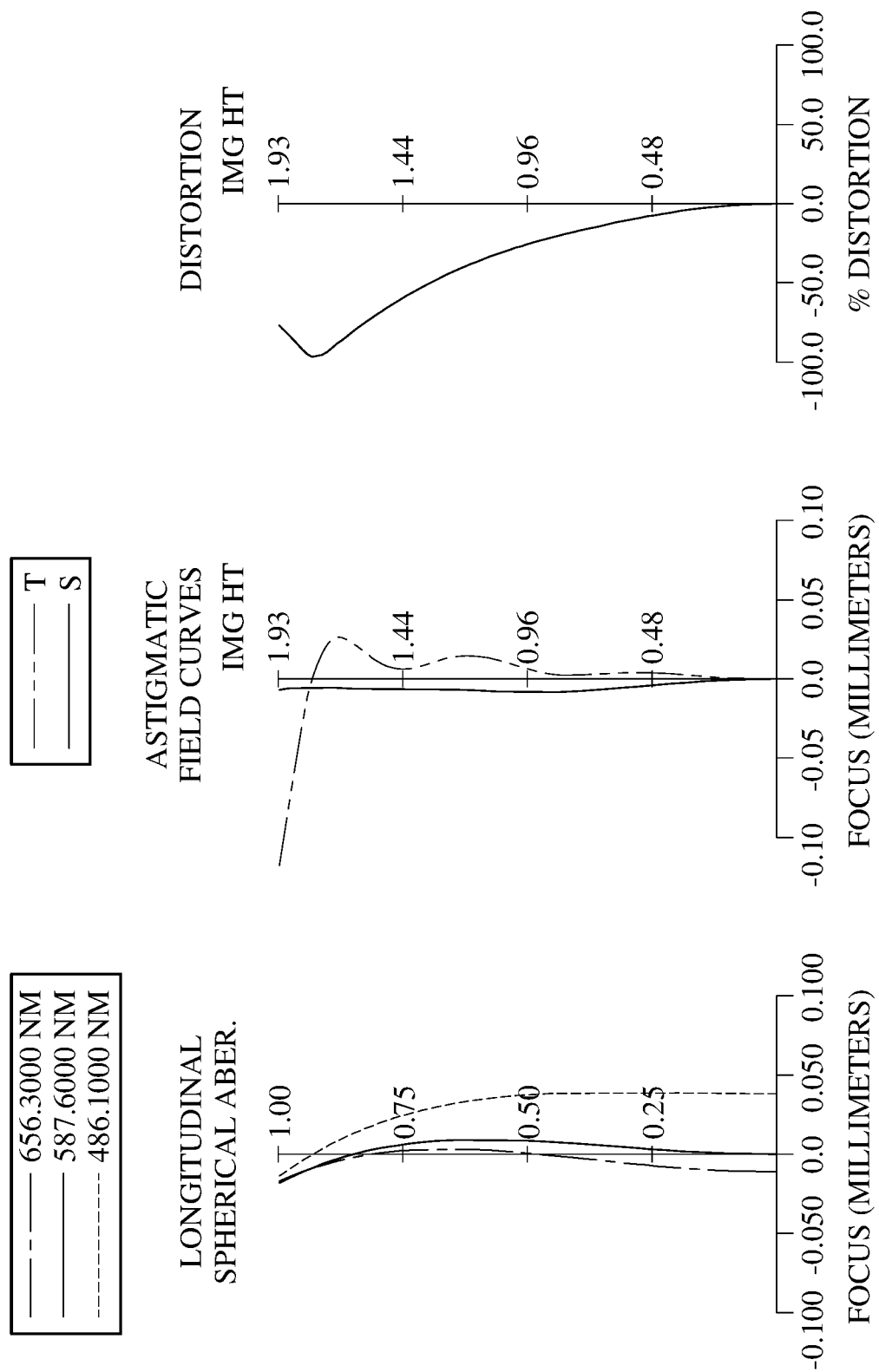
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 390. The optical imaging lens assembly includes, in order from an object side to an image side, a first lens element 310, a second lens element 320, a third lens element 330, an aperture stop 300, a fourth lens element 340, a stop 301, a fifth lens element 350, a sixth lens element 360, a filter 370, a cover glass 375 and an image surface 380. The optical imaging lens assembly includes six lens elements (310, 320, 330, 340, 350 and 360) with no additional lens element disposed between each of the adjacent six lens elements.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both spherical.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of glass material and has the object-side surface 341 and the image-side surface 342 being both spherical.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one inflection point.

The sixth lens element 360 with positive refractive power has an object-side surface 361 being convex in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 352 of the fifth lens element 350 and the object-side surface 361 of the sixth lens element 360 are cemented to each other.

The filter 370 and the cover glass 375 are both made of glass material and located between the sixth lens element 360 and the image surface 380, and will not affect the focal length of the optical imaging lens assembly. The image sensor 390 is disposed on or near the image surface 380 of the optical imaging lens assembly.

The detailed optical data of the 3rd embodiment are shown in Table 5 and the aspheric surface data are shown in Table 6 below.

TABLE 5

3rd Embodiment
f = 0.97 mm, Fno = 2.00, HFOV = 96.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.510 | | 1.000 | Glass | 1.904 | 31.4 | −5.19 |
| 2 | | 3.097 | | 1.918 | | | | |
| 3 | Lens 2 | −19.007 | (ASP) | 0.884 | Plastic | 1.544 | 55.9 | −2.82 |
| 4 | | 1.696 | (ASP) | 1.466 | | | | |
| 5 | Lens 3 | −24.088 | (ASP) | 1.670 | Plastic | 1.582 | 30.2 | 9.30 |
| 6 | | −4.533 | (ASP) | 1.203 | | | | |
| 7 | Ape. Stop | Plano | | 0.025 | | | | |
| 8 | Lens 4 | 6.295 | | 3.220 | Glass | 1.804 | 46.6 | 4.09 |
| 9 | | −5.319 | | 0.041 | | | | |
| 10 | Stop | Plano | | 0.107 | | | | |
| 11 | Lens 5 | 4.203 | (ASP) | 1.006 | Plastic | 1.639 | 23.5 | −1.27 |
| 12 | | 0.616 | (ASP) | 0.030 | Cemented | 1.485 | 53.2 | |
| 13 | Lens 6 | 0.590 | (ASP) | 3.166 | Plastic | 1.544 | 55.9 | 1.43 |
| 14 | | −2.182 | (ASP) | 0.200 | | | | |
| 15 | Filter | Plano | | 0.300 | Glass | 1.517 | 64.2 | — |
| 16 | | Plano | | 0.200 | | | | |

TABLE 5-continued

3rd Embodiment
f = 0.97 mm, Fno = 2.00, HFOV = 96.5 deg.

| Surface # | | Curvature Radius | Thickness | Material | Index | Abbe # | Focal Length |
|---|---|---|---|---|---|---|---|
| 17 | Cover glass | Plano | 0.400 | Glass | 1.517 | 64.2 | — |
| 18 | | Plano | 0.160 | | | | |
| 19 | Image | Plano | — | | | | |

Note:
Reference wavelength is 587.6 nm (d-line).
An effective radius of the stop 301 (Surface 10) is 1.170 mm.

TABLE 6

Aspheric Coefficients

| Surface # | 3 | 4 | 5 | 6 |
|---|---|---|---|---|
| k = | 1.7963E+01 | −8.0294E−01 | −8.5701E+01 | 5.6899E+00 |
| A4 = | 4.2822E−02 | 1.0692E−01 | 1.4301E−02 | 3.3529E−03 |
| A6 = | −8.8591E−03 | 1.5522E−02 | −9.2035E−03 | 1.6321E−03 |
| A8 = | 7.2321E−04 | −1.0629E−02 | 5.0616E−03 | −2.5661E−03 |
| A10 = | −2.1635E−05 | −6.6888E−04 | −2.0591E−03 | 9.2501E−04 |

| Surface # | 11 | 12 | 13 | 14 |
|---|---|---|---|---|
| k = | −1.0441E+01 | −1.2074E+00 | −1.0510E+00 | −1.5327E+00 |
| A4 = | −1.9402E−02 | −2.1637E−02 | −9.9109E−02 | −1.5540E−03 |
| A6 = | 7.5481E−03 | −4.3409E−02 | −1.0289E−01 | 1.3690E−02 |
| A8 = | −4.4567E−03 | 4.1620E−02 | 1.0235E−01 | −7.1278E−03 |
| A10 = | 1.0117E−03 | −1.0811E−02 | −2.4403E−02 | 1.2619E−03 |

In the 3rd embodiment, the equation of the aspheric surface profiles of the aforementioned lens elements is the same as the equation of the 1st embodiment.
Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.97 | CT6/CT5 | 3.15 |
| Fno | 2.00 | f/EPD | 2.00 |
| HFOV [deg.] | 96.5 | |f5/CT3| | 0.76 |
| 1/|tan(HFOV)| | 0.11 | |f6/CT6| | 0.45 |
| V4 − V5 | 23.1 | |f5/CT6| + |f5/CT3| | 1.16 |
| V3 + V4 + V5 | 100.3 | BL/CT3 | 0.75 |
| (N1 + N4)/2 | 1.854 | (|P1| + |P2| + |P3| + |P4|)/(|P5| + |P6|) | 0.60 |
| N5 + N6 | 3.182 | SAG52 [mm] | 1.246 |
| (R9 + R10)/(R9 − R10) | 1.34 | SAG61 [mm] | 1.274 |
| |R6/R5| | 0.19 | |SAG52 − SAG61| × 100 [mm] | 2.79 |
| |R11/R12| | 0.27 | D [mm] | 0.03 |
| CT1/CT3 | 0.60 | |Dsr7/Dsr8| | 0.01 |
| CT4/CT3 | 1.93 | — | — |

4th Embodiment

Figure 7:
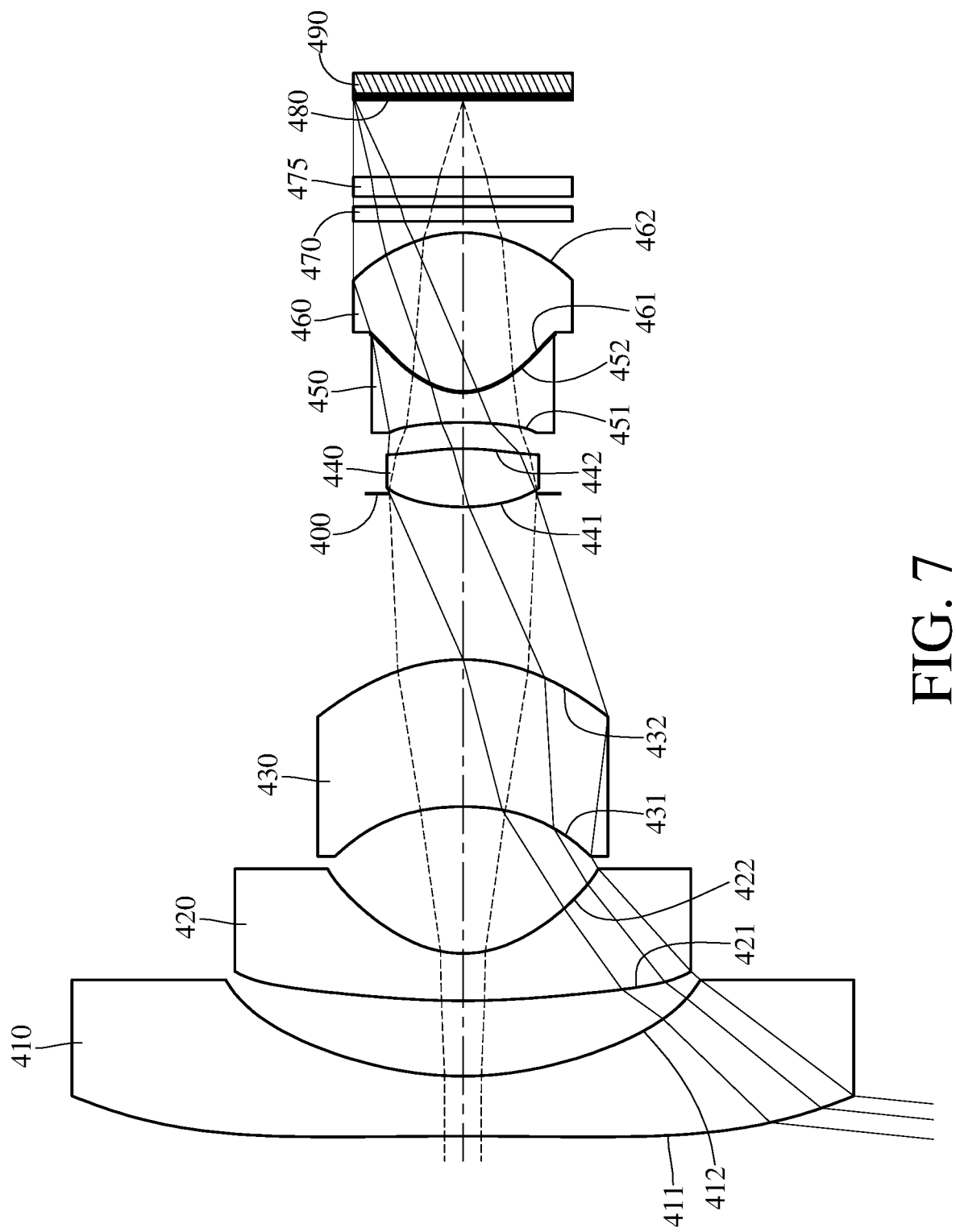
FIG. 7 is a schematic view of an image capturing unit according to the 4th embodiment of the present disclosure.
Figure 8:
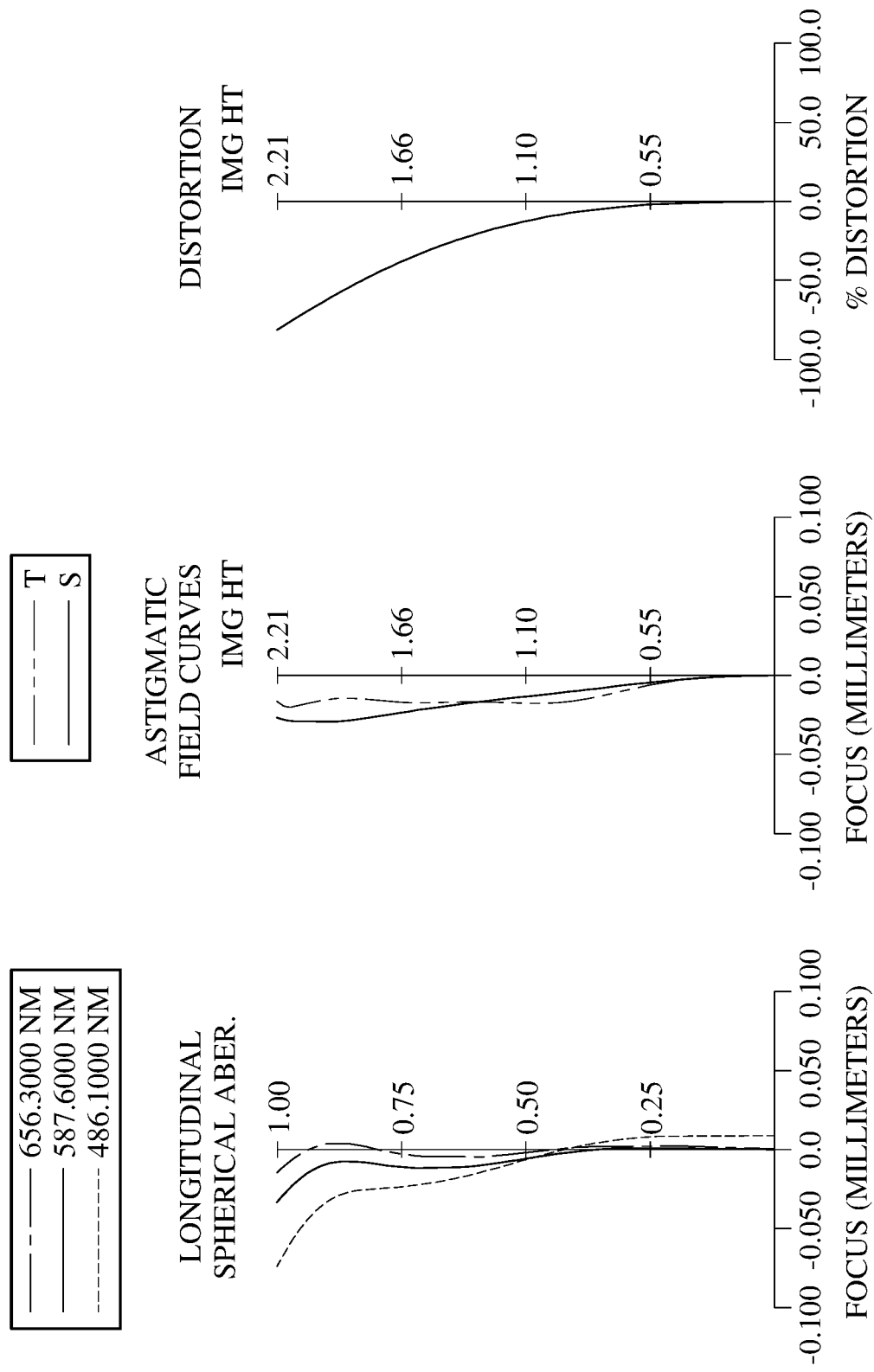
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 490. The optical imaging lens assembly includes, in order from an object side to an image side, a first lens element 410, a second lens element 420, a third lens element 430, an aperture stop 400, a fourth lens element 440, a fifth lens element 450, a sixth lens element 460, a filter 470, a cover glass 475 and an image surface 480. The optical imaging lens assembly includes six lens elements (410, 420, 430, 440, 450 and 460) with no additional lens element disposed between each of the adjacent six lens elements.

The first lens element 410 with negative refractive power has an object-side surface 411 being concave in a paraxial region thereof and an image-side surface 412 being concave in a paraxial region thereof. The first lens element 410 is made of glass material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point.

The sixth lens element 460 with positive refractive power has an object-side surface 461 being convex in a paraxial region thereof and an image-side surface 462 being convex in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 452 of the fifth lens element 450 and the object-side surface 461 of the sixth lens element 460 are cemented to each other.

The filter 470 and the cover glass 475 are both made of glass material and located between the sixth lens element 460 and the image surface 480, and will not affect the focal length of the optical imaging lens assembly. The image sensor 490 is disposed on or near the image surface 480 of the optical imaging lens assembly.

The detailed optical data of the 4th embodiment are shown in Table 7 and the aspheric surface data are shown in Table 8 below.

TABLE 7

4th Embodiment
f = 1.25 mm, Fno = 1.68, HFOV = 84.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −111.478 | (ASP) | 1.216 | Glass | 1.723 | 38.0 | −8.88 |
| 2 | | 6.846 | (ASP) | 1.530 | | | | |
| 3 | Lens 2 | 16.620 | (ASP) | 0.959 | Plastic | 1.544 | 55.9 | −4.86 |
| 4 | | 2.233 | (ASP) | 2.976 | | | | |
| 5 | Lens 3 | −4.938 | (ASP) | 2.982 | Plastic | 1.614 | 26.0 | 12.76 |
| 6 | | −3.725 | (ASP) | 3.362 | | | | |
| 7 | Ape. Stop | Plano | | −0.268 | | | | |
| 8 | Lens 4 | 4.124 | (ASP) | 1.182 | Plastic | 1.584 | 28.2 | 4.05 |
| 9 | | −4.970 | (ASP) | 0.531 | | | | |
| 10 | Lens 5 | −7.752 | (ASP) | 0.600 | Plastic | 1.660 | 20.4 | −1.66 |
| 11 | | 1.317 | (ASP) | 0.030 | Cemented | 1.485 | 53.2 | |
| 12 | Lens 6 | 1.201 | (ASP) | 3.217 | Plastic | 1.544 | 55.9 | 2.15 |
| 13 | | −2.537 | (ASP) | 0.230 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 1.559 | | | | |
| 18 | Image | Plano | | — | | | | |

Note:
Reference wavelength is 587.6 nm (d-line).

TABLE 8

Aspheric Coefficients

| Surface # | 1 | 2 | 3 | 4 | 5 | 6 |
|---|---|---|---|---|---|---|
| k= | −9.0700E+01 | 7.5860E−01 | 9.6832E+00 | −4.1909E−01 | −1.5180E−01 | −9.7859E−01 |
| A4= | 1.3444E+00 | −1.9824E−03 | −1.7040E−03 | −7.7603E−03 | −9.0683E−03 | −6.8345E−04 |
| A6= | −5.3056E−01 | 9.7879E−05 | 7.9227E−05 | −9.4225E−04 | 3.8183E−04 | 1.5223E−04 |
| A8= | 6.5115E−01 | −4.5424E−06 | −3.0741E−06 | 1.4594E−04 | 1.4986E−05 | −1.3319E−05 |
| A10= | −3.6875E−01 | 9.5525E−08 | 7.5552E−08 | −1.6516E−05 | −1.4770E−06 | 5.8392E−07 |

| Surface # | 8 | 9 | 10 | 11 | 12 | 13 |
|---|---|---|---|---|---|---|
| k= | 1.5754E+00 | −1.9189E+01 | 2.1307E+01 | −8.2221E−01 | −6.8545E−01 | −1.9269E+00 |
| A4= | 7.6059E−03 | 8.1828E−03 | 1.7022E−02 | −1.6223E−02 | −1.0528E−01 | 2.5076E−05 |
| A6= | 1.8051E−03 | −2.2263E−04 | −1.5898E−02 | −2.0631E−02 | 2.5877E−02 | −8.5967E−04 |
| A8= | −4.4535E−04 | 9.4773E−04 | 6.4661E−03 | 2.0516E−02 | 9.7614E−03 | −4.4927E−05 |
| A10= | 1.7686E−04 | −2.2369E−04 | −1.4234E−03 | −7.1477E−03 | −7.0195E−03 | 5.4855E−07 |
| A12= | — | — | — | 8.0706E−04 | 8.9183E−04 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.25 | CT6/CT5 | 5.36 |
| Fno | 1.68 | f/EPD | 1.68 |
| HFOV [deg.] | 84.1 | |f5/CT3| | 0.56 |
| 1/|tan(HFOV)| | 0.10 | |f6/CT6| | 0.67 |
| V4 − V5 | 7.8 | |f5/CT6| + |f5/CT3| | 1.07 |
| V3 + V4 + V5 | 74.6 | BL/CT3 | 0.90 |
| (N1 + N4)/2 | 1.654 | (|P1| + |P2| + |P3| + |P4|)/(|P5| + |P6|) | 0.60 |
| N5 + N6 | 3.204 | SAG52 [mm] | 1.174 |
| (R9 + R10)/(R9 − R10) | 0.71 | SAG61 [mm] | 1.198 |
| |R6/R5| | 0.75 | |SAG52 − SAG61| × 100 [mm] | 2.43 |
| |R11/R12| | 0.47 | D [mm] | 0.03 |
| CT1/CT3 | 0.41 | |Dsr7/Dsr8| | 0.29 |
| CT4/CT3 | 0.40 | — | |

5th Embodiment

Figure 9:
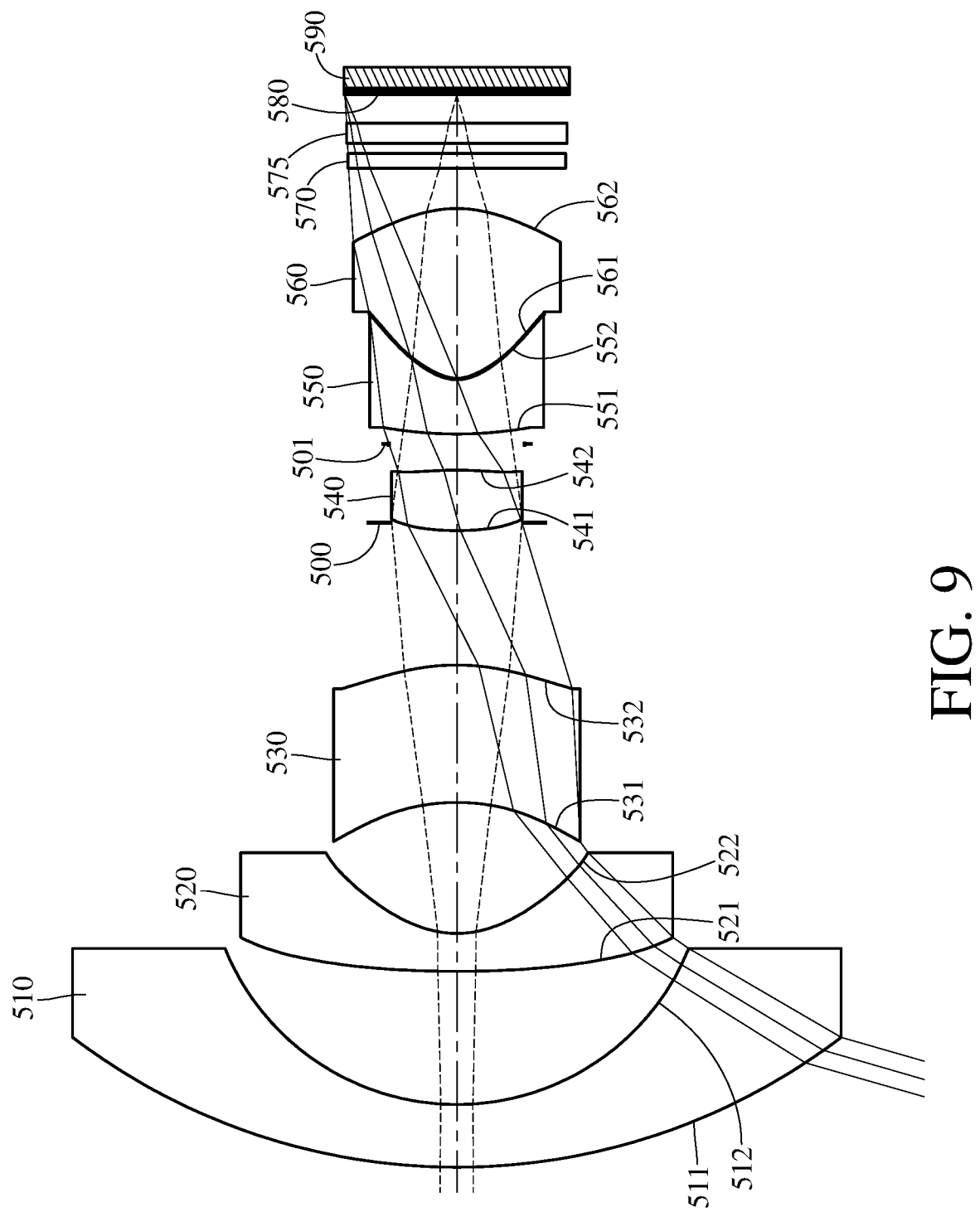
FIG. 9 is a schematic view of an image capturing unit according to the 5th embodiment of the present disclosure.
Figure 10:
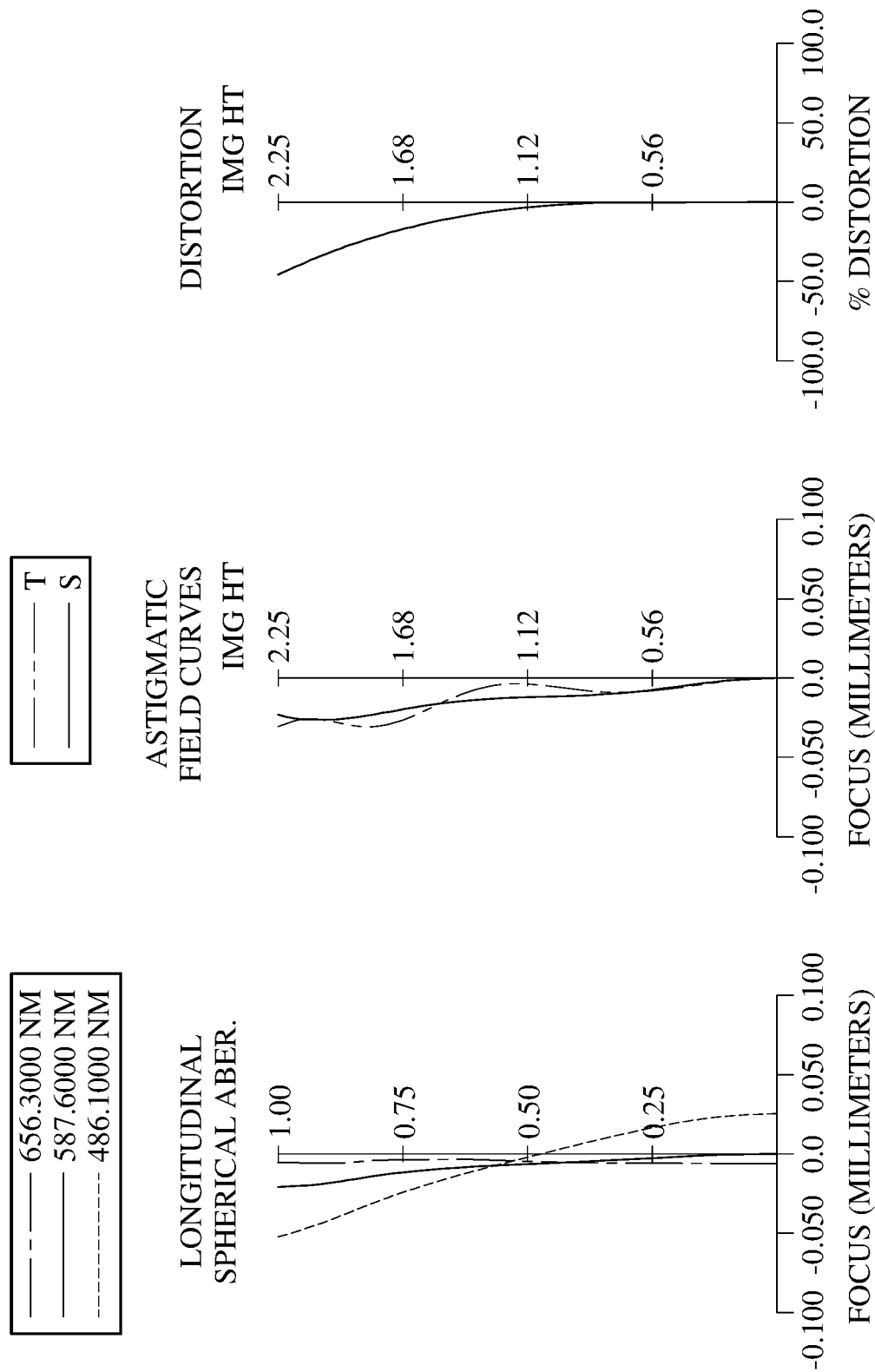
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 590. The optical imaging lens assembly includes, in order from an object side to an image side, a first lens element 510, a second lens element 520, a third lens element 530, an aperture stop 500, a fourth lens element 540, a stop 501, a fifth lens element 550, a sixth lens element 560, a filter 570, a cover glass 575 and an image surface 580. The optical imaging lens assembly includes six lens elements (510, 520, 530, 540, 550 and 560) with no additional lens element disposed between each of the adjacent six lens elements.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 552 of the fifth lens element 550 and the object-side surface 561 of the sixth lens element 560 are cemented to each other.

The filter 570 and the cover glass 575 are both made of glass material and located between the sixth lens element 560 and the image surface 580, and will not affect the focal length of the optical imaging lens assembly. The image sensor 590 is disposed on or near the image surface 580 of the optical imaging lens assembly.

The detailed optical data of the 5th embodiment are shown in Table 9 and the aspheric surface data are shown in Table 10 below.

TABLE 9

5th Embodiment
f = 1.19 mm, Fno = 1.80, HFOV = 74.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.584 | | 1.250 | Glass | 1.569 | 56.1 | −15.40 |
| 2 | | 4.979 | | 2.653 | | | | |
| 3 | Lens 2 | 22.650 | (ASP) | 0.756 | Plastic | 1.544 | 55.9 | −4.14 |
| 4 | | 2.024 | (ASP) | 2.608 | | | | |
| 5 | Lens 3 | −4.201 | (ASP) | 2.738 | Plastic | 1.639 | 23.5 | 33.61 |
| 6 | | −4.406 | (ASP) | 2.834 | | | | |
| 7 | Ape. Stop | Plano | | −0.156 | | | | |
| 8 | Lens 4 | 5.500 | (ASP) | 1.205 | Plastic | 1.582 | 30.2 | 5.47 |
| 9 | | −6.960 | (ASP) | 0.521 | | | | |
| 10 | Stop | Plano | | 0.199 | | | | |

TABLE 9-continued

5th Embodiment
f = 1.19 mm, Fno = 1.80, HFOV = 74.0 deg.

| Surface # | | Curvature Radius | | Thickness | Material | Index | Abbe # | Focal Length |
|---|---|---|---|---|---|---|---|---|
| 11 | Lens 5 | 7.796 | (ASP) | 1.082 | Plastic | 1.639 | 23.5 | −1.51 |
| 12 | | 0.811 | (ASP) | 0.030 | Cemented | 1.485 | 53.2 | |
| 13 | Lens 6 | 0.719 | (ASP) | 3.380 | Plastic | 1.544 | 55.9 | 1.64 |
| 14 | | −2.446 | (ASP) | 0.800 | | | | |
| 15 | Filter | Plano | | 0.300 | Glass | 1.517 | 64.2 | — |
| 16 | | Plano | | 0.200 | | | | |
| 17 | Cover glass | Plano | | 0.400 | Glass | 1.517 | 64.2 | — |
| 18 | | Plano | | 0.565 | | | | |
| 19 | Image | Plano | | — | | | | |

Note:
Reference wavelength is 587.6 nm (d-line).
An effective radius of the stop 501 (Surface 10) is 1.350 mm.

TABLE 10

Aspheric Coefficients

| Surface # | 3 | 4 | 5 | 6 | 8 |
|---|---|---|---|---|---|
| k = | −9.2975E+00 | −4.8668E−01 | −1.0277E+00 | −3.5576E+00 | 5.6129E+00 |
| A4 = | 1.1185E−03 | −1.4537E−02 | −8.1613E−03 | −6.9563E−04 | 1.7466E−02 |
| A6 = | −8.3316E−05 | 3.4209E−04 | 1.2928E−03 | 4.9224E−04 | −8.2354E−04 |
| A8 = | 5.1278E−06 | −1.3010E−04 | 1.5167E−05 | 3.8950E−05 | 1.5990E−03 |
| A10 = | −7.4638E−08 | 1.4429E−06 | −9.2880E−06 | −9.1898E−06 | −2.0754E−04 |

| Surface # | 9 | 11 | 12 | 13 | 14 |
|---|---|---|---|---|---|
| k = | −2.2066E+01 | 1.7230E+01 | −1.1367E+00 | −8.7358E−01 | −1.5856E+00 |
| A4 = | 2.3588E−02 | −7.6045E−03 | −1.7334E−01 | −4.6296E−01 | 1.2594E−02 |
| A6 = | 1.2991E−03 | −1.0148E−03 | 1.3702E−01 | 3.4322E−01 | −1.8380E−03 |
| A8 = | 1.6374E−03 | 5.1728E−04 | −5.5361E−02 | −1.4988E−01 | 1.2690E−04 |
| A10 = | 4.8659E−04 | −1.4360E−04 | 1.0652E−02 | 3.0871E−02 | −5.2033E−06 |
| A12 = | — | — | −7.7598E−04 | −2.6199E−03 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.19 | CT6/CT5 | 3.12 |
| Fno | 1.80 | f/EPD | 1.80 |
| HFOV [deg.] | 74.0 | |f5/CT3| | 0.55 |
| 1/|tan(HFOV)| | 0.29 | |f6/CT6| | 0.48 |
| V4 − V5 | 6.7 | |f5/CT6| + |f5/CT3| | 1.00 |
| V3 + V4 + V5 | 77.2 | BL/CT3 | 0.83 |
| (N1 + N4)/2 | 1.576 | (|P1| + |P2| + |P3| + |P4|)/ (|P5| + |P6|) | 0.41 |
| N5 + N6 | 3.182 | SAG52 [mm] | 1.302 |
| (R9 + R10)/(R9 − R10) | 1.23 | SAG61 [mm] | 1.322 |
| |R6/R5| | 1.05 | |SAG52 − SAG61| × 100 [mm] | 2.02 |
| |R11/R12| | 0.29 | D [mm] | 0.03 |
| CT1/CT3 | 0.46 | |Dsr7/Dsr8| | 0.15 |
| CT4/CT3 | 0.44 | — | — |

6th Embodiment

Figure 11:
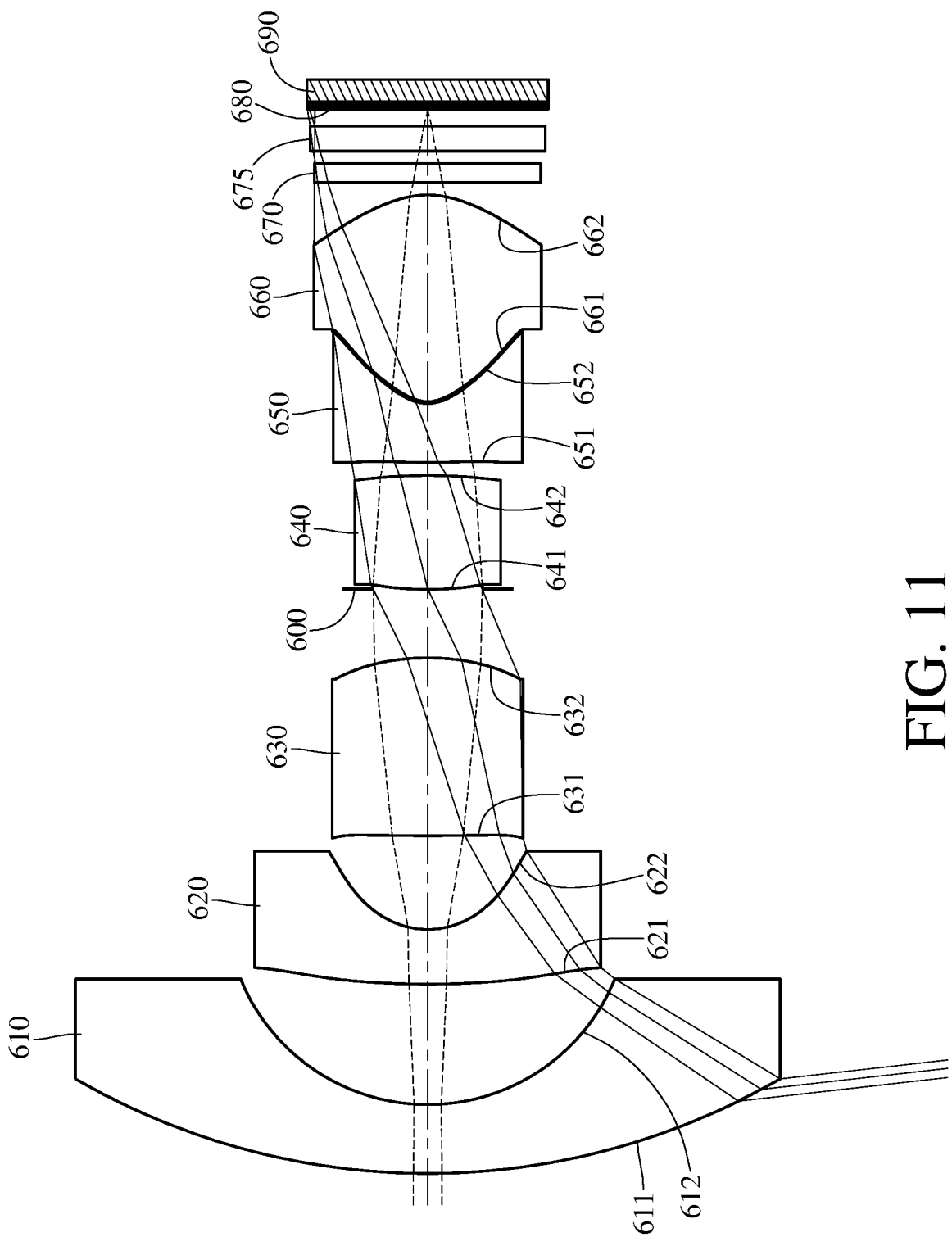
FIG. 11 is a schematic view of an image capturing unit according to the 6th embodiment of the present disclosure.
Figure 12:
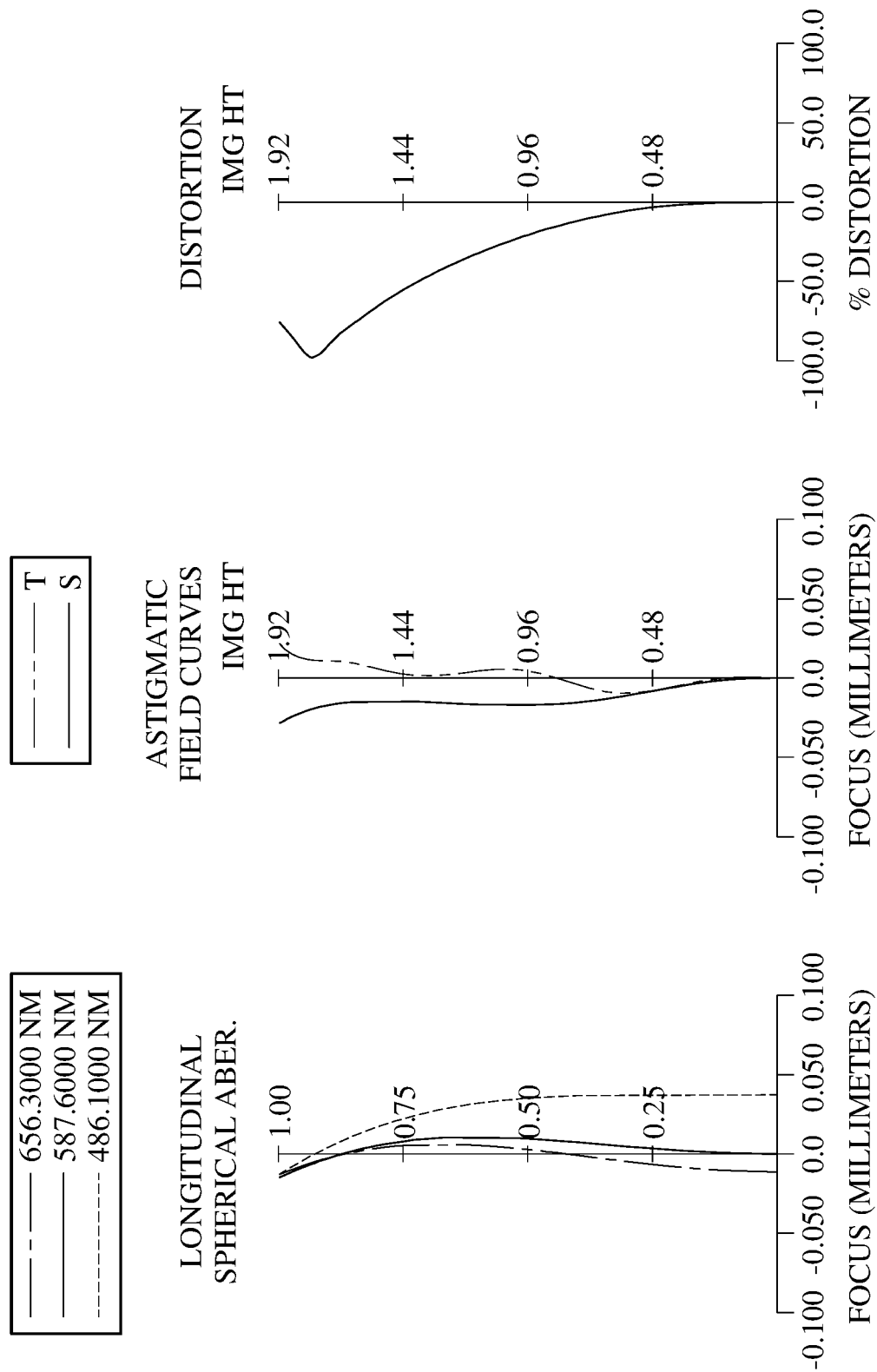
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 690. The optical imaging lens assembly includes, in order from an object side to an image side, a first lens element 610, a second lens element 620, a third lens element 630, an aperture stop 600, a fourth lens element 640, a fifth lens element 650, a sixth lens element 660, a filter 670, a cover glass 675 and an image surface 680. The optical imaging lens assembly includes six lens elements (610, 620, 630, 640, 650 and 660) with no additional lens element disposed between each of the adjacent six lens elements.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of glass material and has the object-side surface 641 and the image-side surface 642 being both spherical.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one inflection point.

The sixth lens element 660 with positive refractive power has an object-side surface 661 being convex in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 652 of the fifth lens element 650 and the object-side surface 661 of the sixth lens element 660 are cemented to each other.

The filter 670 and the cover glass 675 are both made of glass material and located between the sixth lens element 660 and the image surface 680, and will not affect the focal length of the optical imaging lens assembly. The image sensor 690 is disposed on or near the image surface 680 of the optical imaging lens assembly.

The detailed optical data of the 6th embodiment are shown in Table 11 and the aspheric surface data are shown in Table 12 below.

TABLE 11

6th Embodiment
f = 0.91 mm, Fno = 2.00, HFOV = 96.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.197 | | 1.100 | Glass | 1.904 | 31.4 | −5.36 |
| 2 | | 3.224 | | 1.924 | | | | |
| 3 | Lens 2 | 13.176 | (ASP) | 0.874 | Plastic | 1.544 | 55.9 | −2.70 |
| 4 | | 1.290 | (ASP) | 1.496 | | | | |
| 5 | Lens 3 | 40.467 | (ASP) | 2.841 | Plastic | 1.582 | 30.2 | 6.14 |
| 6 | | −3.820 | (ASP) | 1.097 | | | | |
| 7 | Ape. Stop | Plano | | −0.004 | | | | |
| 8 | Lens 4 | 5.117 | | 1.820 | Glass | 1.804 | 46.6 | 4.24 |
| 9 | | −8.607 | | 0.207 | | | | |
| 10 | Lens 5 | 9.306 | (ASP) | 0.943 | Plastic | 1.639 | 23.5 | −1.05 |
| 11 | | 0.603 | (ASP) | 0.030 | Cemented | 1.485 | 53.2 | |
| 12 | Lens 6 | 0.540 | (ASP) | 3.300 | Plastic | 1.544 | 55.9 | 1.76 |
| 13 | | −1.429 | (ASP) | 0.200 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.271 | | | | |
| 18 | Image | Plano | | — | | | | |

Note:
Reference wavelength is 587.6 nm (d-line).

TABLE 12

Aspheric Coefficients

| Surface # | 3 | 4 | 5 | 6 |
|---|---|---|---|---|
| k = | −2.1813E+01 | −1.0074E+00 | −5.3279E+01 | 3.2207E+00 |
| A4 = | −3.1241E−03 | 1.0240E−02 | −2.8779E−04 | 5.2359E−04 |
| A6 = | 3.4584E−03 | 2.7907E−02 | −3.5875E−03 | −3.8573E−04 |
| A8 = | −8.6789E−04 | −4.9716E−04 | 2.3880E−03 | −1.1330E−04 |
| A10 = | 8.6420E−05 | −1.2650E−03 | −1.3719E−03 | 3.4059E−04 |
| A12 = | −3.1689E−06 | −2.7560E−04 | — | — |

| Surface # | 10 | 11 | 12 | 13 |
|---|---|---|---|---|
| k = | −2.6771E+01 | −1.4684E+00 | −1.3603E+00 | −4.0687E+00 |
| A4 = | −5.2804E−02 | −2.0252E−01 | −5.0222E−01 | −3.4544E−02 |
| A6 = | 2.4894E−02 | 2.7568E−01 | 6.6757E−01 | 1.3373E−02 |
| A8 = | −1.2158E−02 | −1.7643E−01 | −4.1645E−01 | −2.9881E−03 |
| A10 = | 2.8156E−03 | 5.8621E−02 | 1.3312E−01 | 2.9995E−04 |
| A12 = | — | −8.3843E−03 | −1.7975E−02 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.91 | CT6/CT5 | 3.50 |
| Fno | 2.00 | f/EPD | 2.00 |
| HFOV [deg.] | 96.4 | |f5/CT3| | 0.37 |
| 1/|tan(HFOV)| | 0.11 | |f6/CT6| | 0.53 |
| V4 − V5 | 23.1 | |f5/CT6| + |f5/CT3| | 0.69 |
| V3 + V4 + V5 | 100.3 | BL/CT3 | 0.48 |
| (N1 + N4)/2 | 1.854 | (|P1| + |P2| + |P3| + |P4|)/(|P5| + |P6|) | 0.63 |
| N5 + N6 | 3.182 | SAG52 [mm] | 1.146 |
| (R9 + R10)/(R9 − R10) | 1.14 | SAG61 [mm] | 1.158 |
| |R6/R5| | 0.09 | |SAG52 − SAG61| × 100 [mm] | 1.25 |
| |R11/R12| | 0.38 | D [mm] | 0.03 |
| CT1/CT3 | 0.39 | |Dsr7/Dsr8| | 0.002 |
| CT4/CT3 | 0.64 | — | — |

7th Embodiment

Figure 13:
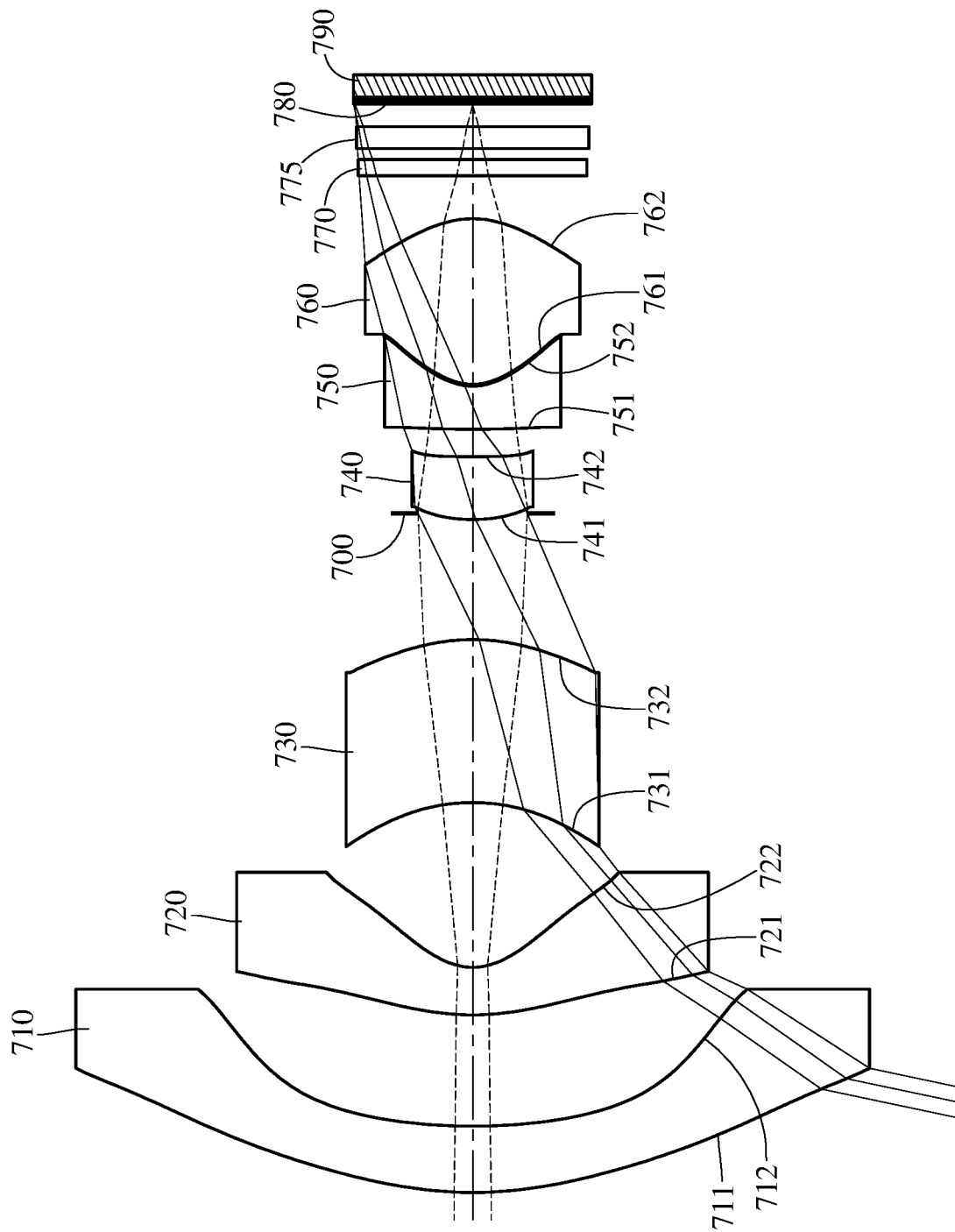
FIG. 13 is a schematic view of an image capturing unit according to the 7th embodiment of the present disclosure.
Figure 14:
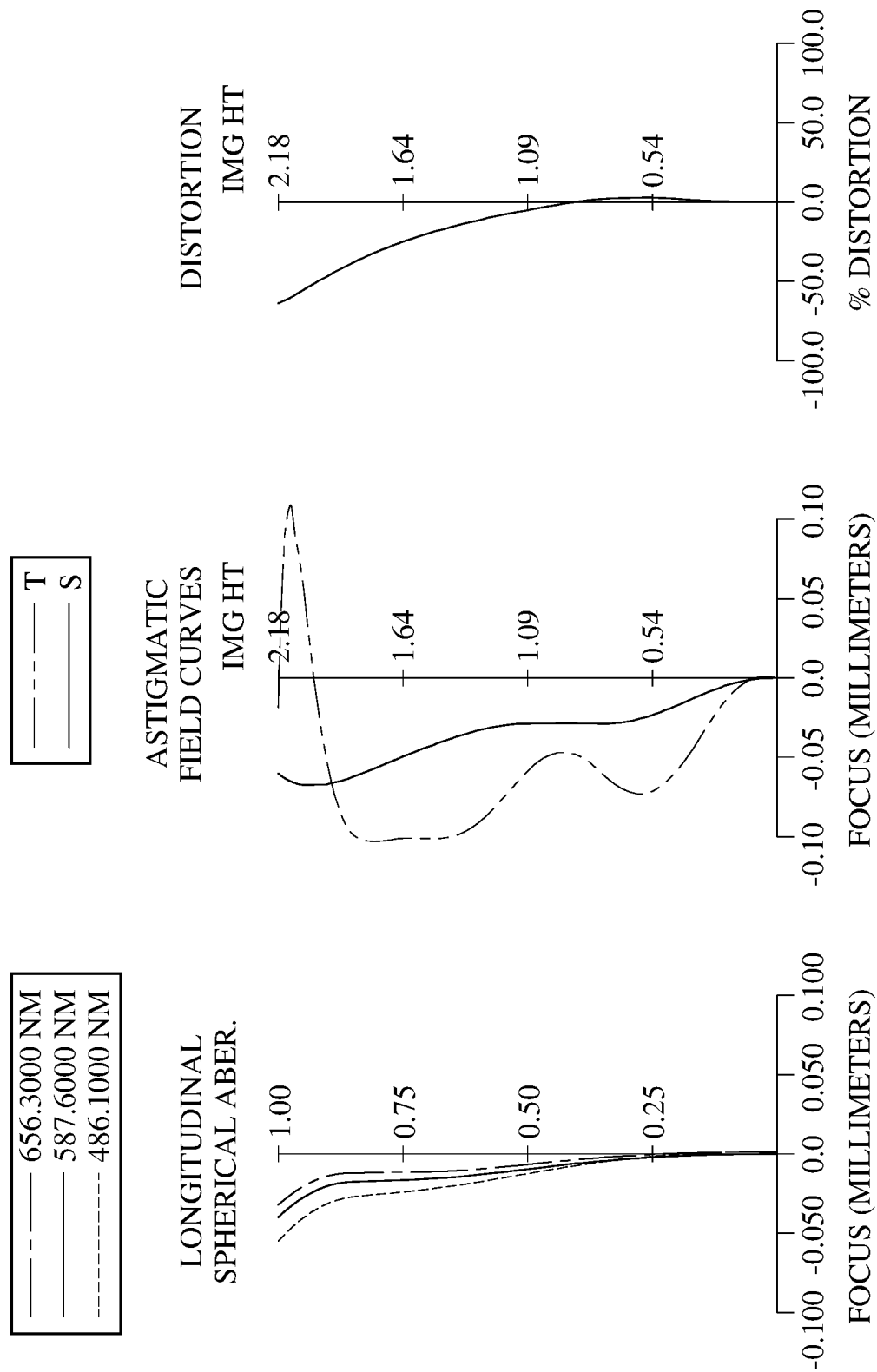
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 790. The optical imaging lens assembly includes, in order from an object side to an image side, a first lens element 710, a second lens element 720, a third lens element 730, an aperture stop 700, a fourth lens element 740, a fifth lens element 750, a sixth lens element 760, a filter 770, a cover glass 775 and an image surface 780. The optical imaging lens assembly includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one inflection point.

The sixth lens element 760 with positive refractive power has an object-side surface 761 being convex in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has at least one inflection point. The image-side surface 752 of the fifth lens element 750 and the object-side surface 761 of the sixth lens element 760 are cemented to each other.

The filter 770 and the cover glass 775 are both made of glass material and located between the sixth lens element 760 and the image surface 780, and will not affect the focal length of the optical imaging lens assembly. The image sensor 790 is disposed on or near the image surface 780 of the optical imaging lens assembly.

The detailed optical data of the 7th embodiment are shown in Table 13 and the aspheric surface data are shown in Table 14 below.

TABLE 13

7th Embodiment
f = 1.29 mm, Fno = 1.89, HFOV = 78.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.267 | (ASP) | 1.215 | Plastic | 1.545 | 56.0 | 33.89 |
| 2 | | 11.279 | (ASP) | 2.037 | | | | |
| 3 | Lens 2 | 4.766 | (ASP) | 0.873 | Plastic | 1.544 | 55.9 | −2.83 |
| 4 | | 1.089 | (ASP) | 3.017 | | | | |
| 5 | Lens 3 | −3.713 | (ASP) | 2.987 | Plastic | 1.639 | 23.5 | 17.98 |
| 6 | | −3.685 | (ASP) | 2.313 | | | | |
| 7 | Ape. Stop | Plano | | −0.113 | | | | |
| 8 | Lens 4 | 2.990 | (ASP) | 1.152 | Plastic | 1.566 | 37.4 | 5.44 |

TABLE 13-continued

7th Embodiment
f = 1.29 mm, Fno = 1.89, HFOV = 78.0 deg.

| Surface # | | Curvature Radius | | Thickness | Material | Index | Abbe # | Focal Length |
|---|---|---|---|---|---|---|---|---|
| 9 | | 90.909 | (ASP) | 0.502 | | | | |
| 10 | Lens 5 | 23.285 | (ASP) | 0.791 | Plastic | 1.639 | 23.5 | −1.73 |
| 11 | | 1.040 | (ASP) | 0.030 | Cemented | 1.485 | 53.2 | |
| 12 | Lens 6 | 0.971 | (ASP) | 3.036 | Plastic | 1.544 | 55.9 | 1.90 |
| 13 | | −1.699 | (ASP) | 0.785 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.416 | | | | |
| 18 | Image | Plano | | — | | | | |

Note:
Reference wavelength is 587.6 nm (d-line).

TABLE 14

Aspheric Coefficients

| Surface # | 1 | 2 | 3 | 4 | 5 | 6 |
|---|---|---|---|---|---|---|
| k= | −2.4869E+00 | 3.7562E+00 | −3.5967E+00 | −8.6507E−01 | −7.2283E−01 | −2.3015E+00 |
| A4= | −1.2681E−03 | 1.1792E−03 | −2.9522E−03 | −5.6833E−02 | −1.2070E−02 | −7.7210E−04 |
| A6= | 6.5799E−05 | −9.7334E−05 | −1.6846E−04 | −2.2984E−03 | 3.9007E−03 | 1.1484E−03 |
| A8= | −1.4169E−06 | 1.6736E−05 | 2.4107E−05 | 8.3684E−04 | −5.4273E−04 | −2.9312E−04 |
| A10= | 1.0527E−08 | −5.1530E−07 | −6.2757E−07 | −6.9197E−05 | 2.9872E−05 | 2.2095E−05 |

| Surface # | 8 | 9 | 10 | 11 | 12 | 13 |
|---|---|---|---|---|---|---|
| k= | 9.1341E−01 | −9.0000E+01 | 6.9761E+01 | −1.2307E+00 | −7.4935E−01 | −1.5610E+00 |
| A4= | 2.0322E−02 | 5.2160E−02 | 4.5999E−03 | −4.7275E−02 | −1.6968E−01 | 1.7745E−02 |
| A6= | 9.2040E−03 | 1.1794E−02 | −7.3234E−03 | 7.0061E−03 | 3.8475E−02 | −9.2449E−04 |
| A8= | −9.1229E−03 | −7.2110E−03 | 4.6834E−03 | 1.0756E−02 | 5.8819E−03 | −1.0070E−03 |
| A10= | 4.3979E−03 | 5.6471E−03 | −1.3934E−03 | −6.2757E−03 | −7.4122E−03 | 1.7129E−04 |
| A12= | — | — | — | 8.0706E−04 | 8.9183E−04 | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.29 | CT6/CT5 | 3.84 |
| Fno | 1.89 | f/EPD | 1.89 |
| HFOV [deg.] | 78.0 | |f5/CT3| | 0.58 |
| 1/|tan(HFOV)| | 0.21 | |f6/CT6| | 0.62 |
| V4 − V5 | 13.9 | |f5/CT6| + |f5/CT3| | 1.15 |
| V3 + V4 + V5 | 84.4 | BL/CT3 | 0.70 |
| (N1 + N4)/2 | 1.555 | (|P1| + |P2| + |P3| + |P4|)/(|P5| + |P6|) | 0.56 |
| N5 + N6 | 3.182 | SAG52 [mm] | 0.912 |
| (R9 + R10)/(R9 − R10) | 1.09 | SAG61 [mm] | 0.921 |
| |R6/R5| | 0.99 | |SAG52 − SAG61| × 100 [mm] | 0.94 |
| |R11/R12| | 0.57 | D [mm] | 0.03 |
| CT1/CT3 | 0.41 | |Dsr7/Dsr8| | 0.11 |
| CT4/CT3 | 0.39 | — | — |

8th Embodiment

Figure 15:
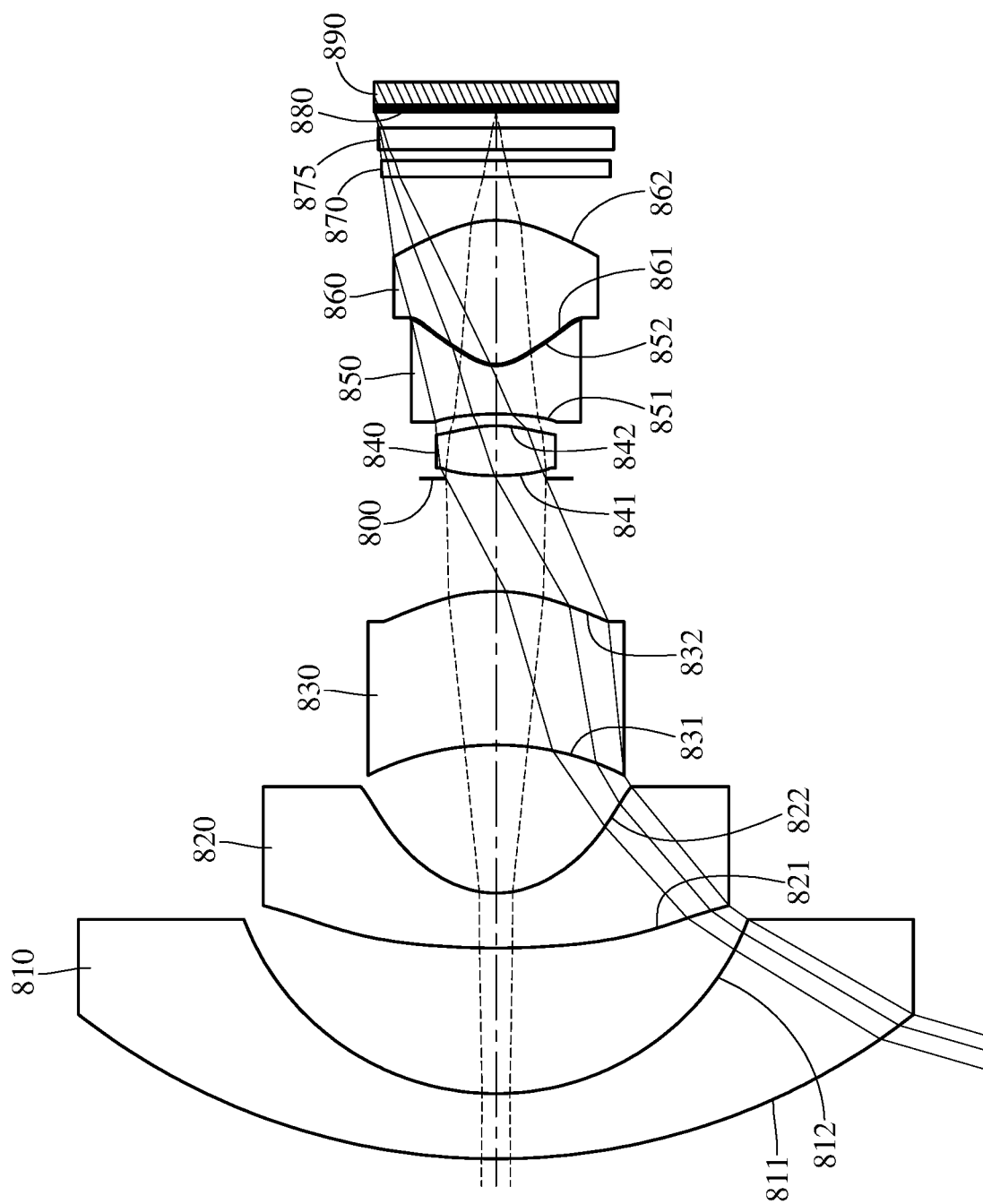
FIG. 15 is a schematic view of an image capturing unit according to the 8th embodiment of the present disclosure.
Figure 16:
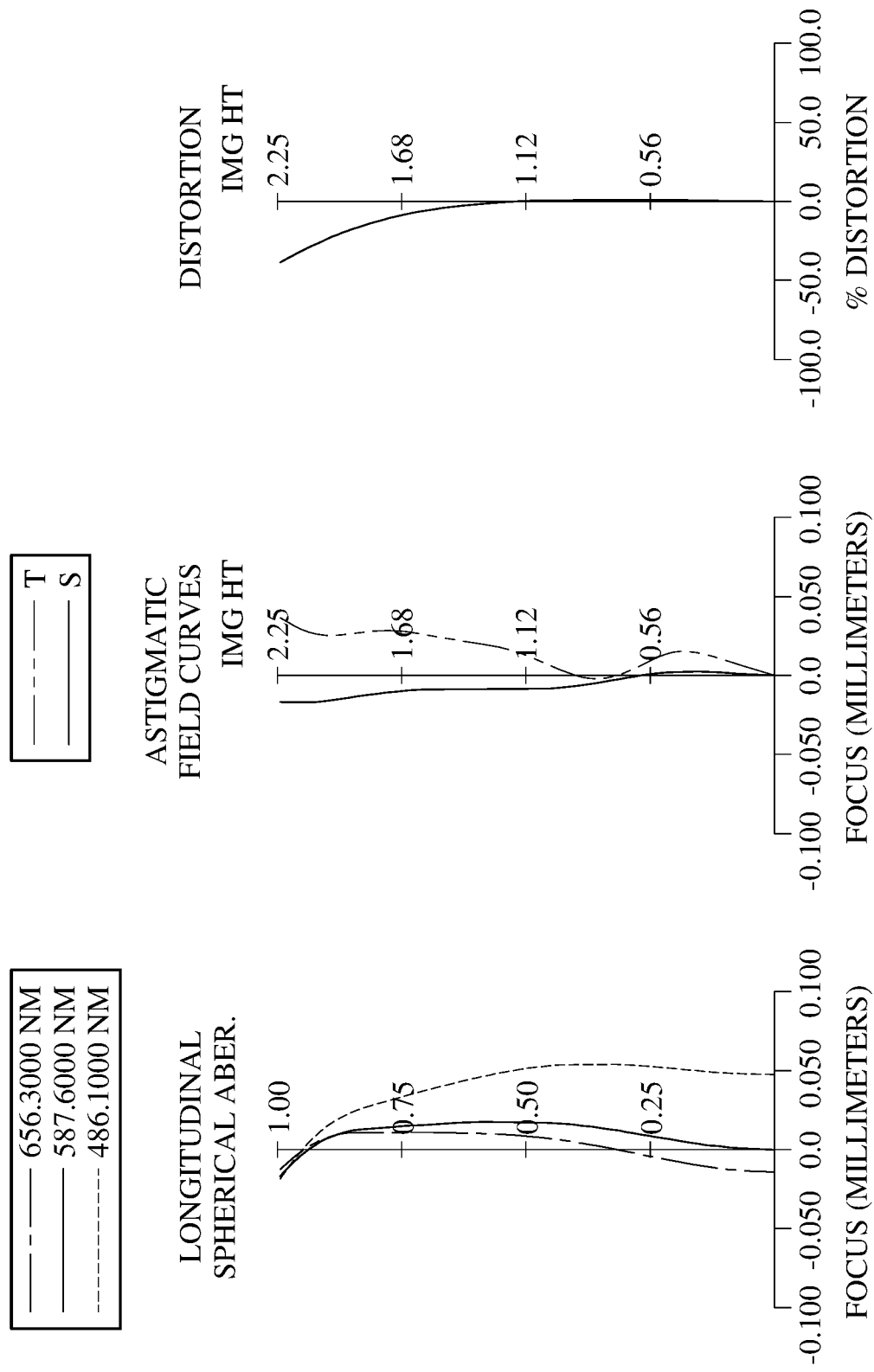
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 890. The optical imaging lens assembly includes, in order from an object side to an image side, a first lens element 810, a second lens element 820, a third lens element 830, an aperture stop 800, a fourth lens element 840, a fifth lens element 850, a sixth lens element 860, a filter 870, a cover glass 875 and an image surface 880. The optical imaging lens assembly includes six lens elements (810, 820, 830, 840, 850 and 860) with no additional lens element disposed between each of the adjacent six lens elements.

The first lens element 810 with negative refractive power has an object-side surface 811 being convex in a paraxial region thereof and an image-side surface 812 being concave in a paraxial region thereof. The first lens element 810 is made of glass material and has the object-side surface 811 and the image-side surface 812 being both spherical.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one inflection point.

The sixth lens element 860 with positive refractive power has an object-side surface 861 being convex in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has at least one inflection point. The image-side surface 852 of the fifth lens element 850 and the object-side surface 861 of the sixth lens element 860 are cemented to each other.

The filter 870 and the cover glass 875 are both made of glass material and located between the sixth lens element 860 and the image surface 880, and will not affect the focal length of the optical imaging lens assembly. The image sensor 890 is disposed on or near the image surface 880 of the optical imaging lens assembly.

The detailed optical data of the 8th embodiment are shown in Table 15 and the aspheric surface data are shown in Table 16 below.

TABLE 15

8th Embodiment
f = 1.06 mm, Fno = 2.00, HFOV = 73.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.417 | | 1.200 | Glass | 1.569 | 56.1 | −15.39 |
| 2 | | 4.954 | | 2.682 | | | | |
| 3 | Lens 2 | 15.436 | (ASP) | 1.010 | Plastic | 1.544 | 55.9 | −3.76 |
| 4 | | 1.765 | (ASP) | 2.729 | | | | |
| 5 | Lens 3 | −5.500 | (ASP) | 2.828 | Plastic | 1.544 | 55.9 | 9.20 |
| 6 | | −3.093 | (ASP) | 2.078 | | | | |
| 7 | Ape. Stop | Plano | | 0.054 | | | | |
| 8 | Lens 4 | 5.412 | (ASP) | 0.919 | Plastic | 1.582 | 30.2 | 2.78 |
| 9 | | −2.171 | (ASP) | 0.216 | | | | |
| 10 | Lens 5 | −4.859 | (ASP) | 0.887 | Plastic | 1.639 | 23.5 | −0.88 |
| 11 | | 0.685 | (ASP) | 0.030 | Cemented | 1.485 | 53.2 | |
| 12 | Lens 6 | 0.671 | (ASP) | 2.649 | Plastic | 1.544 | 55.9 | 1.43 |
| 13 | | −1.878 | (ASP) | 0.800 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.295 | | | | |
| 18 | Image | Plano | | — | | | | |

Note:
Reference wavelength is 587.6 nm (d-line).

TABLE 16

Aspheric Coefficients

| Surface # | 3 | 4 | 5 | 6 | 8 |
|---|---|---|---|---|---|
| k = | −3.8575E+01 | −8.5040E−01 | 3.1697E+00 | −1.8858E+00 | 5.5677E+00 |
| A4 = | 8.0552E−04 | −5.6565E−03 | −2.1875E−03 | 4.5819E−03 | 3.3904E−02 |
| A6 = | 3.0902E−04 | −4.0535E−04 | 1.7230E−03 | −5.6624E−04 | 1.1759E−03 |
| A8 = | −2.6390E−05 | 1.1387E−03 | −2.0383E−04 | 1.2173E−04 | 9.9099E−04 |
| A10 = | 5.7337E−07 | −1.4385E−04 | 1.5626E−05 | −2.3308E−06 | 1.6300E−03 |

| Surface # | 9 | 10 | 11 | 12 | 13 |
|---|---|---|---|---|---|
| k = | −9.3052E+00 | 1.4999E+01 | −1.7180E+00 | −1.7872E+00 | −5.6938E+00 |
| A4 = | 2.1011E−02 | 4.2354E−02 | −1.1127E−01 | −5.3983E−02 | −4.3814E−02 |
| A6 = | −2.0797E−02 | −5.2205E−02 | −1.1590E−02 | −1.7043E−02 | 2.6154E−02 |
| A8 = | 4.0168E−02 | 5.4734E−02 | 7.9333E−02 | 2.3969E−01 | −7.1783E−03 |
| A10 = | −1.9478E−02 | −2.0697E−02 | −4.0196E−02 | −1.0556E−01 | 7.1856E−04 |
| A12 = | — | — | 5.8122E−03 | 1.5076E−02 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.06 | CT6/CT5 | 2.99 |
| Fno | 2.00 | f/EPD | 2.00 |
| HFOV [deg.] | 73.9 | |f5/CT3| | 0.31 |
| 1/|tan(HFOV)| | 0.29 | |f6/CT6| | 0.54 |
| V4 − V5 | 6.7 | |f5/CT6| + |f5/CT3| | 0.65 |
| V3 + V4 + V5 | 109.6 | BL/CT3 | 0.71 |
| (N1 + N4)/2 | 1.576 | (|P1| + |P2| + |P3| + |P4|)/(|P5| + |P6|) | 0.44 |
| N5 + N6 | 3.182 | SAG52 [mm] | 0.851 |
| (R9 + R10)/(R9 − R10) | 0.75 | SAG61 [mm] | 0.856 |
| |R6/R5| | 0.56 | |SAG52 − SAG61| × 100 [mm] | 0.42 |
| |R11/R12| | 0.36 | D [mm] | 0.03 |
| CT1/CT3 | 0.42 | |Dsr7/Dsr8| | 0.06 |
| CT4/CT3 | 0.32 | — | — |

9th Embodiment

Figure 17:
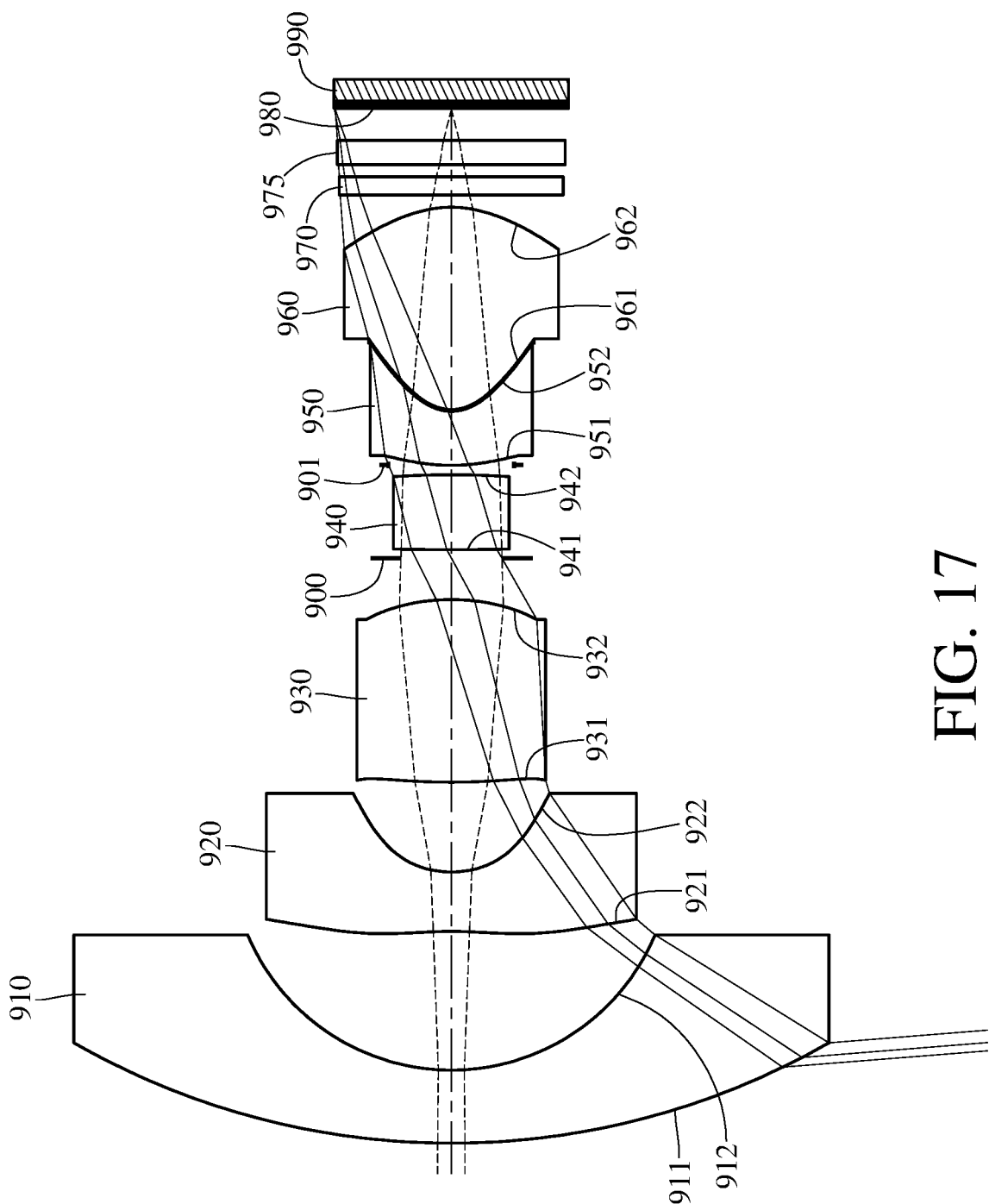
FIG. 17 is a schematic view of an image capturing unit according to the 9th embodiment of the present disclosure.
Figure 18:
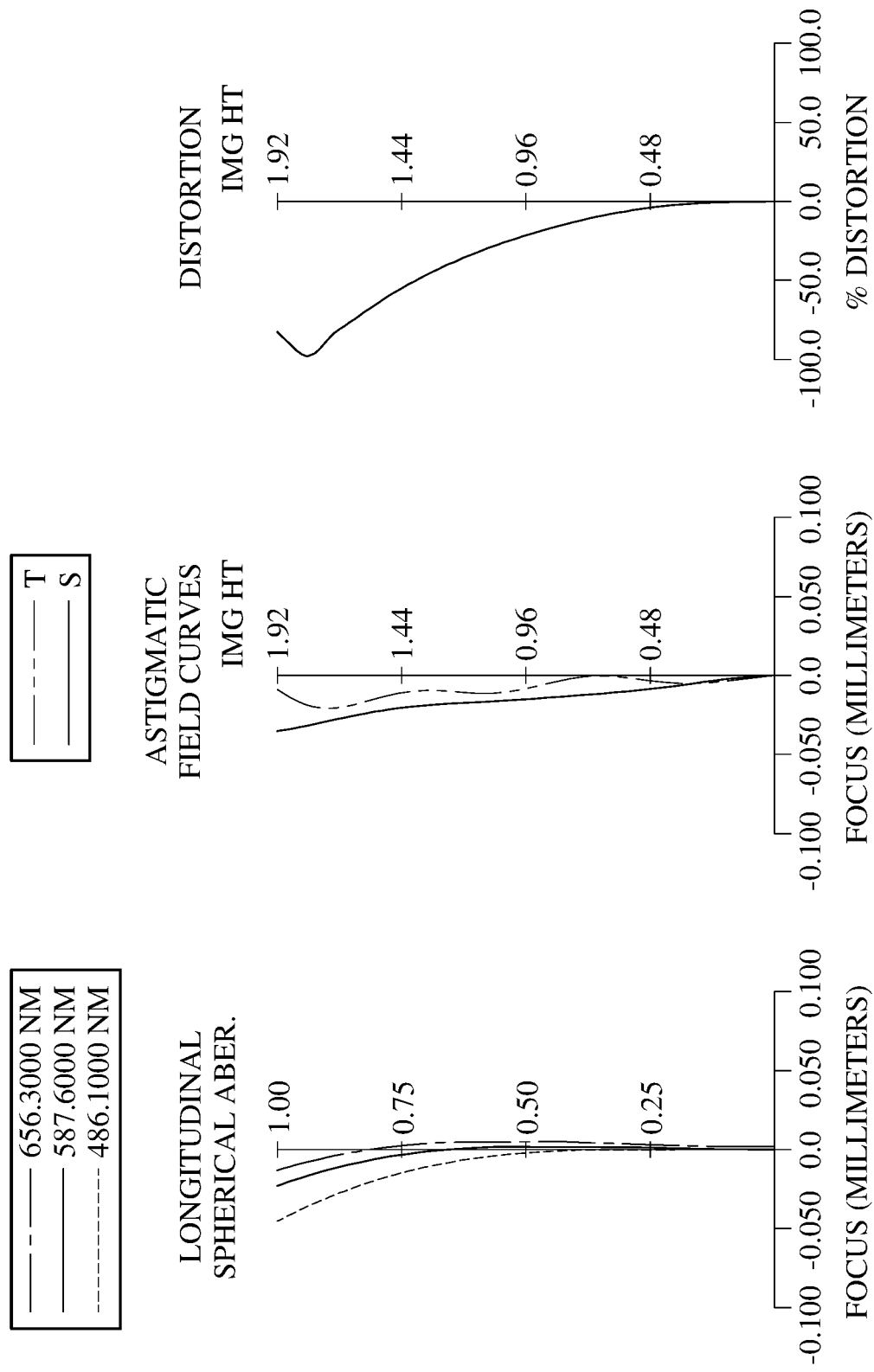
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 990. The optical imaging lens assembly includes, in order from an object side to an image side, a first lens element 910, a second lens element 920, a third lens element 930, an aperture stop 900, a fourth lens element 940, a stop 901, a fifth lens element 950, a sixth lens element 960, a filter 970, a cover glass 975 and an image surface 980. The optical imaging lens assembly includes six lens elements (910, 920, 930, 940, 950 and 960) with no additional lens element disposed between each of the adjacent six lens elements.

The first lens element 910 with negative refractive power has an object-side surface 911 being convex in a paraxial region thereof and an image-side surface 912 being concave in a paraxial region thereof. The first lens element 910 is made of glass material and has the object-side surface 911 and the image-side surface 912 being both spherical.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of glass material and has the object-side surface 941 and the image-side surface 942 being both spherical.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one inflection point.

The sixth lens element 960 with positive refractive power has an object-side surface 961 being convex in a paraxial region thereof and an image-side surface 962 being convex in a paraxial region thereof. The sixth lens element 960 is made of plastic material and has the object-side surface 961 and the image-side surface 962 being both aspheric. The object-side surface 961 of the sixth lens element 960 has at least one inflection point. The image-side surface 952 of the fifth lens element 950 and the object-side surface 961 of the sixth lens element 960 are cemented to each other.

The filter 970 and the cover glass 975 are both made of glass material and located between the sixth lens element 960 and the image surface 980, and will not affect the focal length of the optical imaging lens assembly. The image sensor 990 is disposed on or near the image surface 980 of the optical imaging lens assembly.

The detailed optical data of the 9th embodiment are shown in Table 17 and the aspheric surface data are shown in Table 18 below.

TABLE 17

9th embodiment
f = 0.90 mm, Fno = 2.00, HFOV = 94.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.466 | | 1.200 | Glass | 1.904 | 31.4 | −6.05 |
| 2 | | 3.627 | | 2.279 | | | | |
| 3 | Lens 2 | −6.537 | (ASP) | 0.977 | Plastic | 1.544 | 55.9 | −2.34 |
| 4 | | 1.667 | (ASP) | 1.475 | | | | |
| 5 | Lens 3 | 10.706 | (ASP) | 3.000 | Plastic | 1.639 | 23.5 | 4.44 |
| 6 | | −3.436 | (ASP) | 0.678 | | | | |
| 7 | Ape. Stop | Plano | | 0.143 | | | | |
| 8 | Lens 4 | 50.001 | | 1.230 | Glass | 1.804 | 46.6 | 14.50 |
| 9 | | −15.040 | | 0.163 | | | | |

TABLE 17-continued

9th embodiment
f = 0.90 mm, Fno = 2.00, HFOV = 94.5 deg.

| Surface # | | Curvature Radius | | Thickness | Material | Index | Abbe # | Focal Length |
|---|---|---|---|---|---|---|---|---|
| 10 | Stop | Plano | | −0.008 | | | | |
| 11 | Lens 5 | 3.178 | (ASP) | 0.888 | Plastic | 1.639 | 23.5 | −1.66 |
| 12 | | 0.708 | (ASP) | 0.030 | Cemented | 1.485 | 53.2 | |
| 13 | Lens 6 | 0.709 | (ASP) | 3.323 | Plastic | 1.544 | 55.9 | 1.75 |
| 14 | | −1.809 | (ASP) | 0.200 | | | | |
| 15 | Filter | Plano | | 0.300 | Glass | 1.517 | 64.2 | — |
| 16 | | Plano | | 0.200 | | | | |
| 17 | Cover glass | Plano | | 0.400 | Glass | 1.517 | 64.2 | — |
| 18 | | Plano | | 0.526 | | | | |
| 19 | Image | Plano | | — | | | | |

Note:
Reference wavelength is 587.6 nm (d-line).
An effective radius of the stop 901 (Surface 10) is 1.030 mm.

TABLE 18

Aspheric Coefficients

| Surface # | 3 | 4 | 5 | 6 |
|---|---|---|---|---|
| k = | −9.8000E+01 | −2.6569E−01 | −1.0854E+01 | −5.6358E−01 |
| A4 = | 2.1285E−02 | 5.5898E−02 | −2.0796E−03 | −6.9445E−03 |
| A6 = | −3.3882E−03 | 9.8431E−03 | −1.5239E−03 | −2.8605E−03 |
| A8 = | 2.3592E−04 | −4.0329E−03 | 4.4901E−04 | 1.2738E−03 |
| A10 = | −6.1494E−06 | −6.2661E−04 | −7.1780E−04 | −1.9431E−04 |

| Surface # | 11 | 12 | 13 | 14 |
|---|---|---|---|---|
| k = | 3.8554E+00 | −9.4585E−01 | −8.0958E−01 | −5.6307E+00 |
| A4 = | −3.8406E−02 | 2.4603E−02 | 6.3801E−02 | −4.8471E−02 |
| A6 = | −7.7133E−03 | −1.6620E−01 | −3.5228E−01 | 2.1776E−02 |
| A8 = | 2.5489E−03 | 1.2648E−01 | 2.5075E−01 | −6.0653E−03 |
| A10 = | −2.2024E−03 | −4.4024E−02 | −8.2616E−02 | 6.9982E−04 |
| A12 = | — | 5.5314E−03 | 8.3797E−03 | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.90 | CT6/CT5 | 3.74 |
| Fno | 2.00 | f/EPD | 2.00 |
| HFOV [deg.] | 94.5 | |f5/CT3| | 0.55 |
| 1/|tan(HFOV)| | 0.08 | |f6/CT6| | 0.53 |
| V4 − V5 | 23.1 | |f5/CT6| + |f5/CT3| | 1.05 |
| V3 + V4 + V5 | 93.6 | BL/CT3 | 0.54 |
| (N1 + N4)/2 | 1.854 | (|P1| + |P2| + |P3| + |P4|)/(|P5| + |P6|) | 0.75 |
| N5 + N6 | 3.182 | SAG52 [mm] | 1.119 |
| (R9 + R10)/(R9 − R10) | 1.57 | SAG61 [mm] | 1.159 |
| |R6/R5| | 0.32 | |SAG52 − SAG61| × 100 [mm] | 3.98 |
| |R11/R12| | 0.39 | D [mm] | 0.03 |
| CT1/CT3 | 0.40 | |Dsr7/Dsr8| | 0.10 |
| CT4/CT3 | 0.41 | — | — |

10th Embodiment

Figure 19:
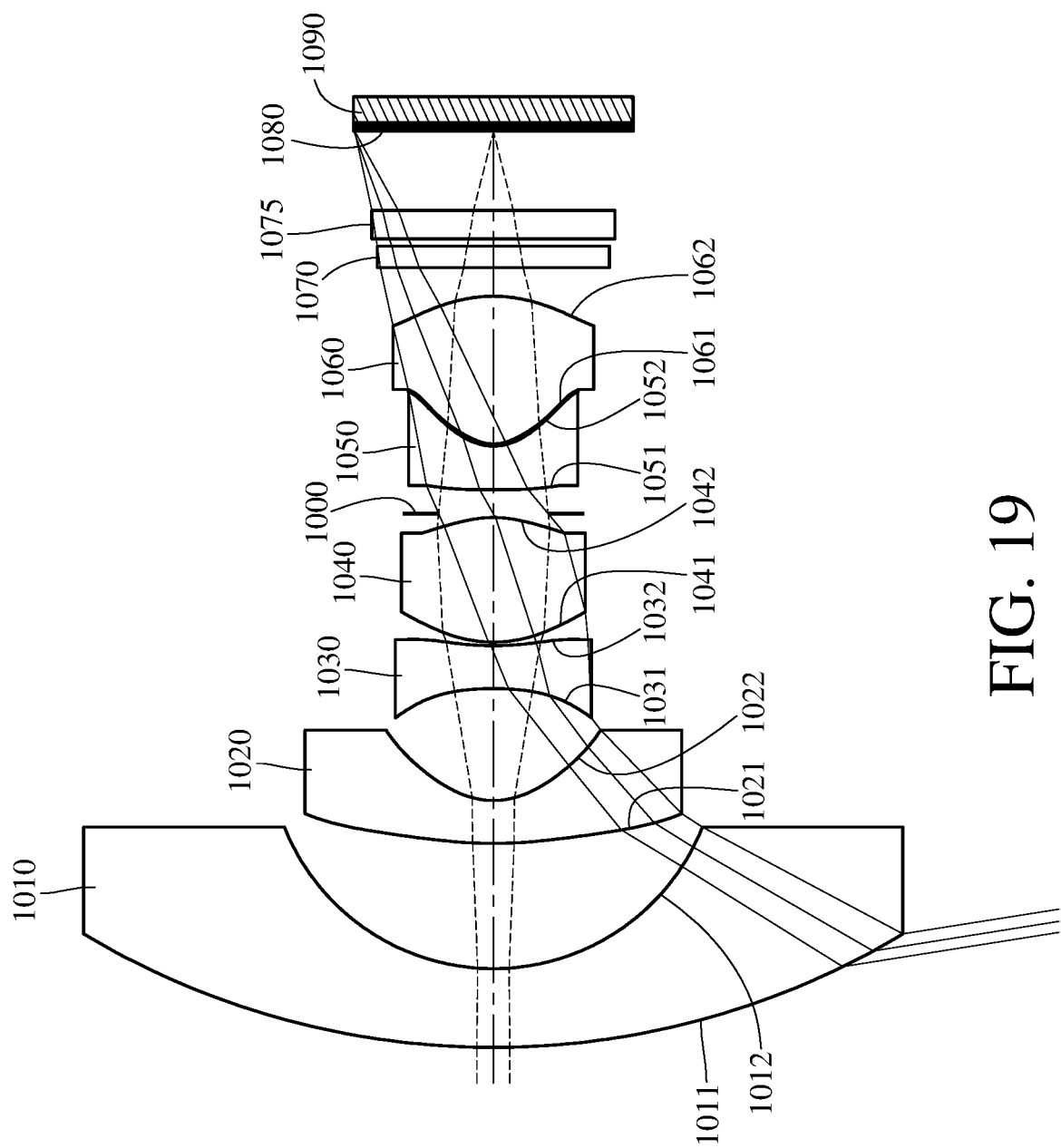
FIG. 19 is a schematic view of an image capturing unit according to the 10th embodiment of the present disclosure.
Figure 20:
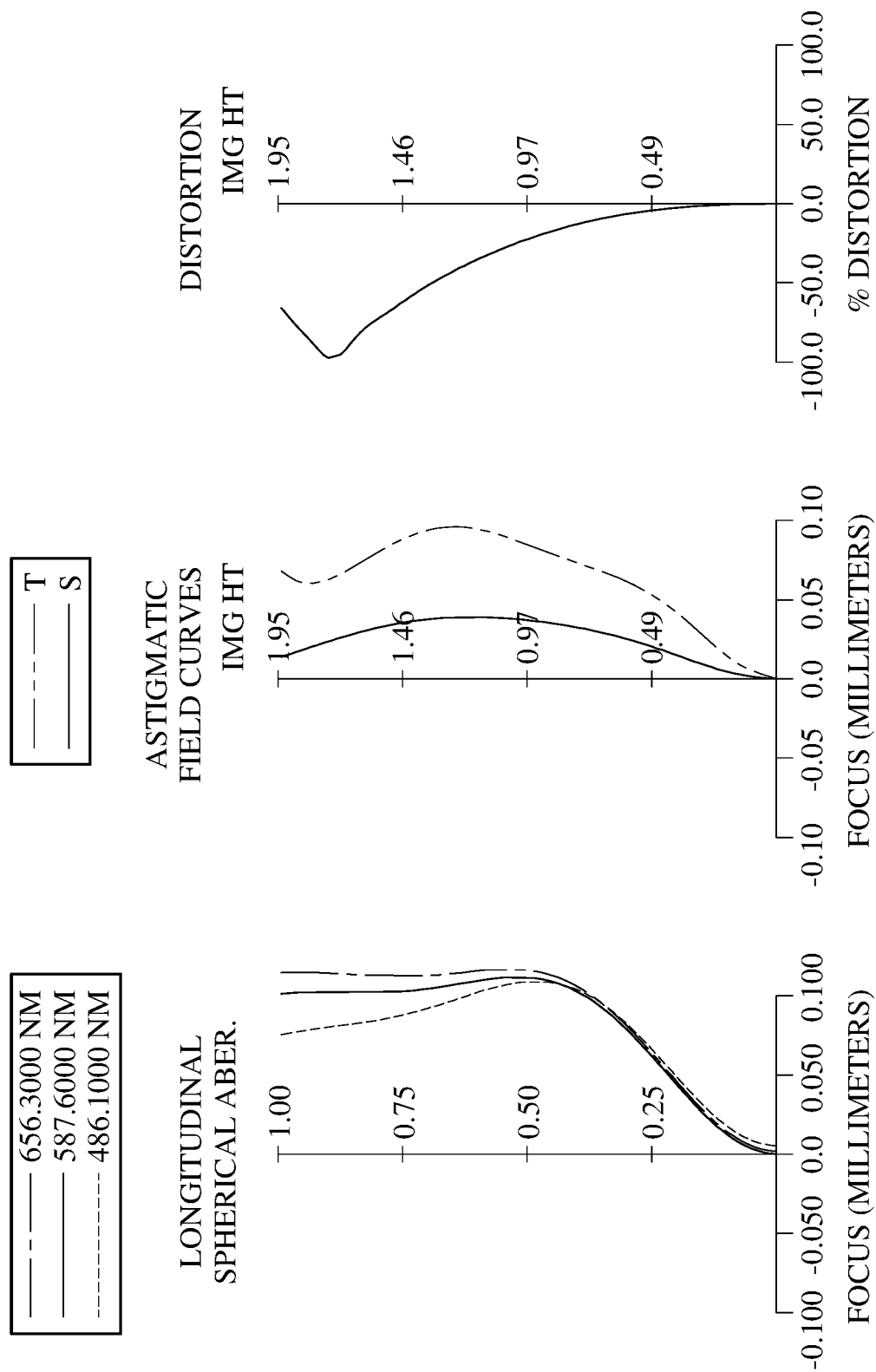
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1090. The optical imaging lens assembly includes, in order from an object side to an image side, a first lens element 1010, a second lens element 1020, a third lens element 1030, a fourth lens element 1040, an aperture stop 1000, a fifth lens element 1050, a sixth lens element 1060, a filter 1070, a cover glass 1075 and an image surface 1080. The optical imaging lens assembly includes six lens elements (1010, 1020, 1030, 1040, 1050 and 1060) with no additional lens element disposed between each of the adjacent six lens elements.

The first lens element 1010 with negative refractive power has an object-side surface 1011 being convex in a paraxial region thereof and an image-side surface 1012 being concave in a paraxial region thereof. The first lens element 1010 is made of glass material and has the object-side surface 1011 and the image-side surface 1012 being both spherical.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one inflection point.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has at least one inflection point. The image-side surface 1052 of the fifth lens element 1050 and the object-side surface 1061 of the sixth lens element 1060 are cemented to each other.

The filter 1070 and the cover glass 1075 are both made of glass material and located between the sixth lens element 1060 and the image surface 1080, and will not affect the focal length of the optical imaging lens assembly. The image sensor 1090 is disposed on or near the image surface 1080 of the optical imaging lens assembly.

The detailed optical data of the 10th embodiment are shown in Table 19 and the aspheric surface data are shown in Table 20 below.

TABLE 19

10th embodiment
f = 0.92 mm, Fno = 2.00, HFOV = 99.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 11.107 | 1.100 | Glass | 1.804 | 46.6 | −5.81 |
| 2 | | 3.142 | 1.750 | | | | |
| 3 | Lens 2 | 5.740 (ASP) | 0.600 | Plastic | 1.544 | 55.9 | −2.56 |
| 4 | | 1.078 (ASP) | 1.564 | | | | |
| 5 | Lens 3 | −4.179 (ASP) | 0.600 | Plastic | 1.544 | 55.9 | −3.81 |
| 6 | | 4.322 (ASP) | 0.050 | | | | |
| 7 | Lens 4 | 1.927 (ASP) | 1.741 | Plastic | 1.582 | 30.2 | 1.80 |
| 8 | | −1.531 (ASP) | 0.055 | | | | |
| 9 | Ape. Stop | Plano | 0.334 | | | | |
| 10 | Lens 5 | −1189.873 (ASP) | 0.609 | Plastic | 1.639 | 23.5 | −1.09 |
| 11 | | 0.697 (ASP) | 0.030 | Cemented | 1.485 | 53.2 | |
| 12 | Lens 6 | 0.529 (ASP) | 2.066 | Plastic | 1.544 | 55.9 | 1.09 |
| 13 | | −1.911 (ASP) | 0.400 | | | | |
| 14 | Filter | Plano | 0.300 | Glass | 1.517 | 64.2 | — |
| 15 | | Plano | 0.100 | | | | |
| 16 | Cover glass | Plano | 0.400 | Glass | 1.517 | 64.2 | — |
| 17 | | Plano | 1.107 | | | | |
| 18 | Image | Plano | — | | | | |

Note:
Reference wavelength is 587.6 nm (d-line).

TABLE 20

Aspheric Coefficients

| Surface # | 3 | 4 | 5 | 6 | 7 |
|---|---|---|---|---|---|
| k = | −8.0218E+00 | −8.9766E−01 | 6.2596E+00 | 1.4578E−01 | −9.6117E−01 |
| A4 = | −1.1538E−02 | −4.5356E−02 | −6.4563E−02 | 5.3444E−02 | 8.9782E−02 |
| A6 = | 2.5326E−03 | 7.9175E−03 | 2.2908E−02 | −1.5318E−01 | −1.4039E−01 |
| A8 = | −2.0053E−04 | −2.3931E−03 | −1.0361E−02 | 8.1886E−02 | 7.4401E−02 |
| A10 = | 7.6026E−06 | 1.5146E−03 | 4.3407E−03 | −1.4346E−02 | −1.4115E−02 |

| Surface # | 8 | 10 | 11 | 12 | 13 |
|---|---|---|---|---|---|
| k = | −9.6872E+00 | −9.9000E+01 | −8.4683E−01 | −3.3602E+00 | −9.5850E+00 |
| A4 = | −6.0326E−02 | 2.3201E−01 | −3.1143E−02 | 4.8153E−01 | −1.0422E−01 |
| A6 = | 1.0949E−01 | −3.3089E−01 | −4.8439E−02 | −1.2572E+00 | 7.6218E−02 |

TABLE 20-continued

| Aspheric Coefficients | | | | |
|---|---|---|---|---|
| A8 = | −9.5098E−02 | 2.4580E−01 | 8.6084E−01 | 2.1647E+00 | −3.4023E−02 |
| A10 = | 3.3012E−02 | −7.8168E−02 | −6.8415E−01 | −1.6620E+00 | 7.6016E−03 |
| A12 = | — | — | 1.8312E−01 | 4.3960E−01 | — |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 0.92 | CT6/CT5 | 3.39 |
| Fno | 2.00 | f/EPD | 2.00 |
| HFOV [deg.] | 99.0 | |f5/CT3| | 1.82 |
| 1/|tan(HFOV)| | 0.16 | |f6/CT6| | 0.53 |
| V4 − V5 | 6.7 | |f5/CT6| + |f5/CT3| | 2.35 |
| V3 + V4 + V5 | 109.6 | BL/CT3 | 3.84 |
| (N1 + N4)/2 | 1.693 | (|P1| + |P2| + |P3| + |P4|)/(|P5| + |P6|) | 0.75 |
| N5 + N6 | 3.182 | SAG52 [mm] | 0.763 |
| (R9 + R10)/(R9 − R10) | 1.00 | SAG61 [mm] | 0.762 |
| |R6/R5| | 1.03 | |SAG52 − SAG61| × 100 [mm] | 0.07 |
| |R11/R12| | 0.28 | D [mm] | 0.03 |
| CT1/CT3 | 1.83 | |Dsr7/Dsr8| | 32.65 |
| CT4/CT3 | 2.90 | — | — |

11th Embodiment

Figure 21:
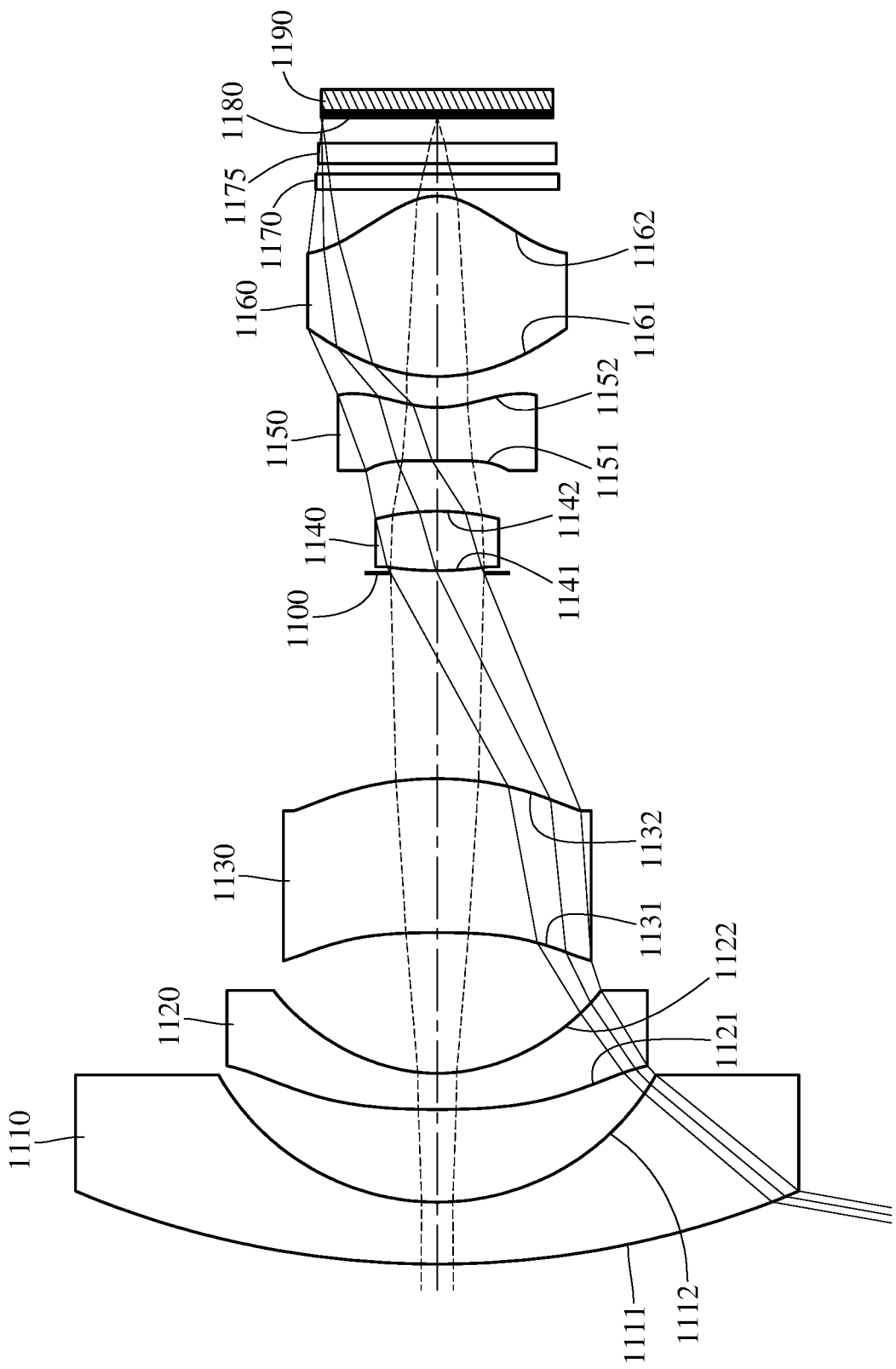
FIG. 21 is a schematic view of an image capturing unit according to the 11th embodiment of the present disclosure.
Figure 22:
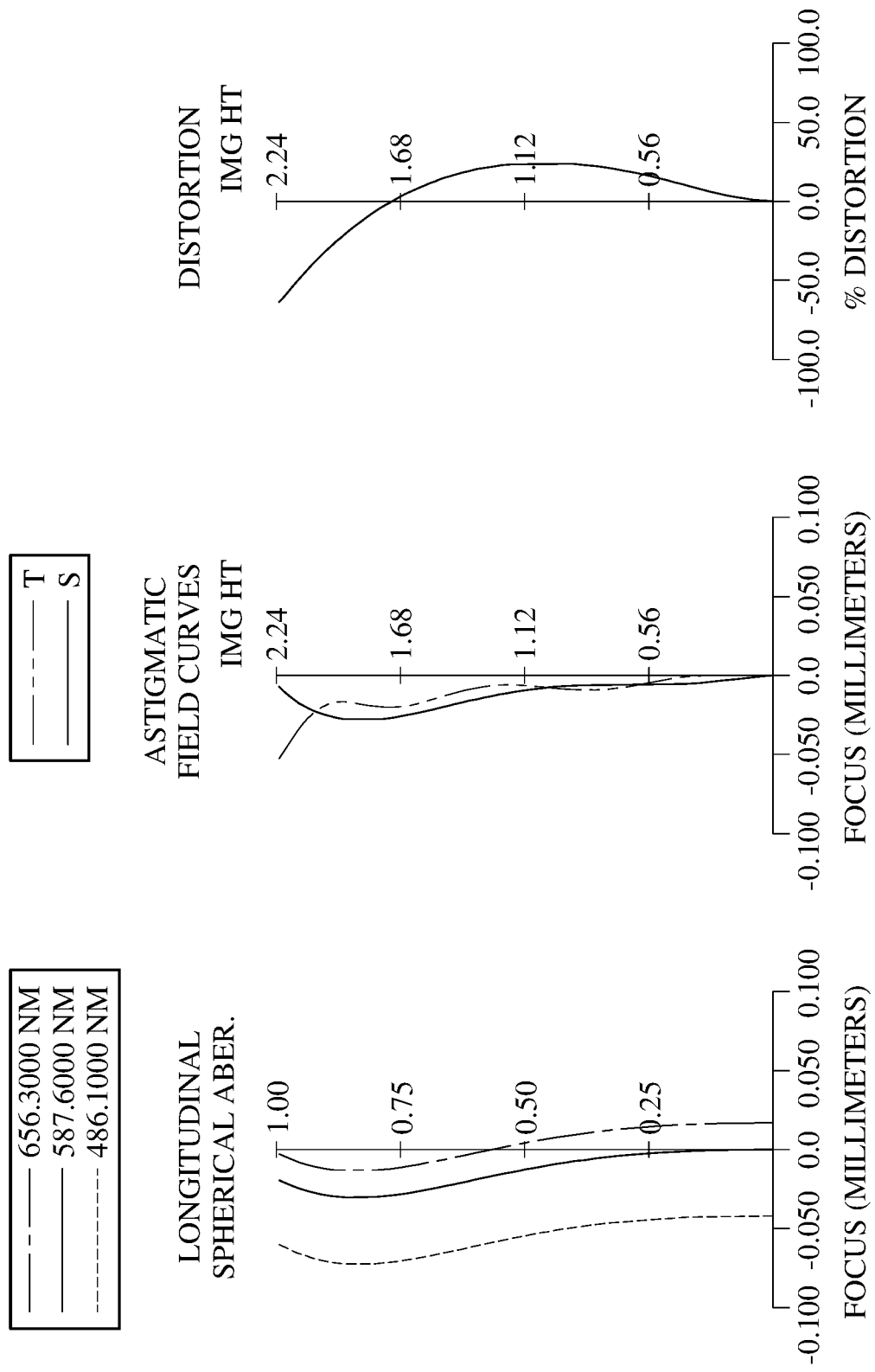
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens assembly (its reference numeral is omitted) of the present disclosure and an image sensor 1190. The optical imaging lens assembly includes, in order from an object side to an image side, a first lens element 1110, a second lens element 1120, a third lens element 1130, an aperture stop 1100, a fourth lens element 1140, a fifth lens element 1150, a sixth lens element 1160, a filter 1170, a cover glass 1175 and an image surface 1180. The optical imaging lens assembly includes six lens elements (1110, 1120, 1130, 1140, 1150 and 1160) with no additional lens element disposed between each of the adjacent six lens elements.

The first lens element 1110 with negative refractive power has an object-side surface 1111 being convex in a paraxial region thereof and an image-side surface 1112 being concave in a paraxial region thereof. The first lens element 1110 is made of glass material and has the object-side surface 1111 and the image-side surface 1112 being both spherical.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with positive refractive power has an object-side surface 1131 being concave in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of plastic material and has the object-side surface 1151 and the image-side surface 1152 being both aspheric. The image-side surface 1152 of the fifth lens element 1150 has at least one inflection point.

The sixth lens element 1160 with positive refractive power has an object-side surface 1161 being convex in a paraxial region thereof and an image-side surface 1162 being convex in a paraxial region thereof. The sixth lens element 1160 is made of plastic material and has the object-side surface 1161 and the image-side surface 1162 being both aspheric. The object-side surface 1161 of the sixth lens element 1160 has at least one inflection point.

The filter 1170 and the cover glass 1175 are both made of glass material and located between the sixth lens element 1160 and the image surface 1180, and will not affect the focal length of the optical imaging lens assembly. The image sensor 1190 is disposed on or near the image surface 1180 of the optical imaging lens assembly.

The detailed optical data of the 11th embodiment are shown in Table 21 and the aspheric surface data are shown in Table 22 below.

TABLE 21

11th Embodiment
f = 1.11 mm, Fno = 1.78, HFOV = 80.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 18.066 | | 1.200 | Glass | 1.786 | 43.9 | −8.85 |
| 2 | | 4.874 | | 1.796 | | | | |
| 3 | Lens 2 | 18.113 | (ASP) | 0.700 | Plastic | 1.544 | 55.9 | −7.77 |
| 4 | | 3.379 | (ASP) | 2.728 | | | | |
| 5 | Lens 3 | −20.504 | (ASP) | 2.984 | Plastic | 1.669 | 19.5 | 13.75 |
| 6 | | −6.719 | (ASP) | 3.988 | | | | |
| 7 | Ape. Stop | Plano | | 0.045 | | | | |
| 8 | Lens 4 | 6.578 | (ASP) | 1.151 | Plastic | 1.614 | 26.0 | 4.87 |
| 9 | | −5.118 | (ASP) | 0.977 | | | | |
| 10 | Lens 5 | 17.825 | (ASP) | 1.035 | Plastic | 1.669 | 19.5 | −3.60 |
| 11 | | 2.073 | (ASP) | 0.600 | | | | |
| 12 | Lens 6 | 3.214 | (ASP) | 3.500 | Plastic | 1.544 | 55.9 | 2.08 |
| 13 | | −1.076 | (ASP) | 0.125 | | | | |
| 14 | Filter | Plano | | 0.300 | Glass | 1.517 | 64.2 | — |
| 15 | | Plano | | 0.200 | | | | |
| 16 | Cover glass | Plano | | 0.400 | Glass | 1.517 | 64.2 | — |
| 17 | | Plano | | 0.490 | | | | |
| 18 | Image | Plano | | — | | | | |

Note:
Reference wavelength is 587.6 nm (d-line).

TABLE 22

Aspheric Coefficients

| Surface # | 3 | 4 | 5 | 6 | 8 |
|---|---|---|---|---|---|
| k = | 1.4111E+01 | −3.8329E−01 | 2.4926E+00 | −4.3251E−01 | −1.2936E+01 |
| A4 = | 4.3232E−03 | −5.7896E−03 | −9.4488E−03 | −3.9600E−03 | 7.4263E−03 |
| A6 = | −1.8445E−04 | 1.2005E−03 | 4.6293E−04 | 6.0019E−04 | 1.3408E−03 |
| A8 = | −3.0010E−06 | −1.4440E−04 | 2.5229E−05 | −3.5634E−05 | −5.8959E−04 |
| A10 = | 8.6146E−08 | 6.5636E−06 | −1.0781E−06 | 1.9000E−06 | −1.4467E−03 |

| Surface # | 9 | 10 | 11 | 12 | 13 |
|---|---|---|---|---|---|
| k = | 5.1343E+00 | −8.1571E+01 | −1.0293E+00 | −3.1103E−01 | −2.4772E+00 |
| A4 = | 4.3171E−04 | −6.9622E−02 | −7.9857E−02 | −4.2299E−03 | 6.9274E−03 |
| A6 = | −2.2639E−03 | −3.9890E−03 | 1.6152E−02 | −1.5869E−05 | −1.5053E−03 |
| A8 = | 8.0785E−03 | 8.4837E−03 | −2.4554E−03 | −2.2249E−05 | 6.0341E−04 |
| A10 = | −4.2272E−03 | −2.6766E−03 | 8.5171E−05 | 1.3724E−05 | −5.0372E−05 |
| A12 = | — | — | 1.0094E−05 | −1.7171E−06 | — |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.11 | CT6/CT5 | 3.38 |
| Fno | 1.78 | f/EPD | 1.78 |
| HFOV [deg.] | 80.0 | |f5/CT3| | 1.21 |
| 1/|tan(HFOV)| | 0.18 | |f6/CT6| | 0.59 |
| V4 − V5 | 6.5 | |f5/CT6| + |f5/CT3| | 2.24 |
| V3 + V4 + V5 | 65.0 | BL/CT3 | 0.51 |
| (N1 + N4)/2 | 1.700 | (|P1| + |P2| + |P3| + |P4|)/(|P5| + |P6|) | 0.69 |

-continued

| 11th Embodiment | | | |
|---|---|---|---|
| N5 + N6 | 3.213 | SAG52 [mm] | 0.237 |
| (R9 + R10)/(R9 − R10) | 1.26 | SAG61 [mm] | 0.934 |
| |R6/R5| | 0.33 | |SAG52 − SAG61| × 100 [mm] | 69.61 |
| |R11/R12| | 2.99 | D [mm] | — |
| CT1/CT3 | 0.40 | |Dsr7/Dsr8| | 0.04 |
| CT4/CT3 | 0.39 | — | |

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising six lens elements, the six lens elements being, in order from an object side to an image side:
   a first lens element;
   a second lens element with negative refractive power having an image-side surface being concave in a paraxial region thereof;
   a third lens element;
   a fourth lens element;
   a fifth lens element having negative refractive power; and
   a sixth lens element having positive refractive power;
   wherein a curvature radius of an object-side surface of the fifth lens element is R9, a curvature radius of an image-side surface of the fifth lens element is R10, a focal length of the optical imaging lens assembly is f, a focal length of the fifth lens element is f5, a focal length of the sixth lens element is f6, an entrance pupil diameter of the optical imaging lens assembly is EPD, a central thickness of the third lens element is CT3, a central thickness of the sixth lens element is CT6, and the following conditions are satisfied:

$0.0<(R9+R10)/(R9-R10)$;

$f/EPD<3.50$;

$|f5/CT3|<1.85$;

$0.10<|f5/CT6|+|f5/CT3|<1.45$; and $|f6/CT6|<0.70$.

2. The optical imaging lens assembly of claim 1, wherein the third lens element has positive refractive power, the sixth lens element has an object-side surface being convex in a paraxial region thereof and an image-side surface being convex in a paraxial region thereof.

3. The optical imaging lens assembly of claim 1, wherein the third lens element has an image-side surface being convex in a paraxial region thereof, the image-side surface of the fifth lens element is concave in a paraxial region thereof, the central thickness of the third lens element is CT3, a central thickness of the fourth lens element is CT4, and the following condition is satisfied:

$CT4/CT3<1.0$.

4. The optical imaging lens assembly of claim 1, wherein the focal length of the fifth lens element is f5, the focal length of the sixth lens element is f6, the central thickness of the third lens element is CT3, the central thickness of the sixth lens element is CT6, and the following conditions are satisfied:

$0.10<|f5/CT3|<1.50$; and $0.10<|f6/CT6|<0.65$.

5. The optical imaging lens assembly of claim 1, wherein the focal length of the optical imaging lens assembly is f, the entrance pupil diameter of the optical imaging lens assembly is EPD, half of a maximum field of view of the optical imaging lens assembly is HFOV, and the following conditions are satisfied:

$0.50<f/EPD<2.50$; and $1/|\tan(HFOV)|<0.35$.

6. The optical imaging lens assembly of claim 1, wherein a central thickness of the first lens element is CT1, the central thickness of the third lens element is CT3, and the following condition is satisfied:

$0.10<CT1/CT3<0.65$.

7. The optical imaging lens assembly of claim 1, wherein a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and the following condition is satisfied:

$(|P1|+|P2|+|P3|+|P4|)/(|P5|+|P6|)<0.70$.

8. The optical imaging lens assembly of claim 1, wherein an axial distance between an image-side surface of the sixth lens element and an image surface is BL, the central thickness of the third lens element is CT3, a focal length of the first lens element is f1, a focal length of the second lens element is f2, a focal length of the third lens element is f3, and the following conditions are satisfied:

$BL/CT3<1.0$;

$|f2|<|f1|$; and $|f2|<|f3|$.

9. The optical imaging lens assembly of claim 1, wherein an Abbe number of the third lens element is V3, an Abbe number of the fourth lens element is V4, an Abbe number of the fifth lens element is V5, and the following condition is satisfied:

$30<V3+V4+V5<105$.

10. The optical imaging lens assembly of claim 1, wherein a central thickness of the fifth lens element is CT5, the central thickness of the sixth lens element is CT6, and the following condition is satisfied:

$0.50<CT6/CT5<5.0$.

11. The optical imaging lens assembly of claim 1, wherein a curvature radius of an object-side surface of the sixth lens element is R11, a curvature radius of an image-side surface of the sixth lens element is R12, and the following condition is satisfied:

$|R11/R12|<0.50$.

12. The optical imaging lens assembly of claim 1, further comprising an aperture stop, wherein at least one of the image-side surface of the fifth lens element and an object-side surface of the sixth lens element has at least one inflection point, an axial distance between the aperture stop and an object-side surface of the fourth lens element is Dsr7, an axial distance between the aperture stop and an image-side surface of the fourth lens element is Dsr8, and the following condition is satisfied:

$|Dsr7/Dsr8|<1.0$.

13. The optical imaging lens assembly of claim 1, wherein the image-side surface of the fifth lens element and an object-side surface of the sixth lens element are both aspheric, the fifth lens element and the sixth lens element are cemented to each other, a refractive index of the fifth lens element is N5, a refractive index of the sixth lens element is N6, and the following condition is satisfied:

$$3.0 < N5 + N6 < 3.30.$$

14. The optical imaging lens assembly of claim 1, wherein a displacement in parallel with an optical axis from an axial vertex of the image-side surface of the fifth lens element to a maximum effective radius position of the image-side surface of the fifth lens element is SAG52, a displacement in parallel with the optical axis from an axial vertex of an object-side surface of the sixth lens element to a maximum effective radius position of the object-side surface of the sixth lens element is SAG61, and the following condition is satisfied:

$$SAG52 < SAG61.$$

15. An image capturing unit, comprising:
the optical imaging lens assembly of claim 1; and
an image sensor disposed on an image surface of the optical imaging lens assembly.

16. An electronic device, comprising:
the image capturing unit of claim 15.

* * * * *